US009704298B2

United States Patent
Espeset et al.

(10) Patent No.: US 9,704,298 B2
(45) Date of Patent: Jul. 11, 2017

(54) SYSTEMS AND METHODS FOR GENERATING 360 DEGREE MIXED REALITY ENVIRONMENTS

(71) Applicant: Paofit Holdings Pte Ltd, Singapore (SG)

(72) Inventors: Tonny Espeset, Oslo (NO); Andrei Richard Frank, Toronto (CA); Marc Scott Hardy, Singapore (SG)

(73) Assignee: Paofit Holdings Pte Ltd., Singapore (SG)

(*) Notice: Subject to any disclaimer, the term of this patent is extended or adjusted under 35 U.S.C. 154(b) by 0 days.

(21) Appl. No.: 15/188,356

(22) Filed: Jun. 21, 2016

(65) Prior Publication Data

US 2016/0379415 A1    Dec. 29, 2016

Related U.S. Application Data

(60) Provisional application No. 62/183,540, filed on Jun. 23, 2015.

(51) Int. Cl.
*G09G 5/00* (2006.01)
*G06T 19/00* (2011.01)
(Continued)

(52) U.S. Cl.
CPC ............ *G06T 19/006* (2013.01); *G06F 3/011* (2013.01); *G06T 7/20* (2013.01); *G06T 7/30* (2017.01); *G06T 15/04* (2013.01); *G11B 27/031* (2013.01); *G06T 2200/32* (2013.01); *G06T 2207/20221* (2013.01); *G06T 2215/12* (2013.01)

(58) Field of Classification Search
CPC combination set(s) only.
See application file for complete search history.

(56) References Cited

U.S. PATENT DOCUMENTS 6,356,297 B1 *   3/2002   Cheng ............... H04N 19/23
                                                    348/36
9,153,073 B2 *  10/2015   Langlotz ............ G06T 19/006
(Continued)

FOREIGN PATENT DOCUMENTS

WO      2013034981 A2     3/2013

OTHER PUBLICATIONS

International Search Report and Written Opinion for International Application No. PCT/SG2016/050283, Search completed Aug. 9, 2016, Mailed Oct. 13, 2016, 20 Pgs.
(Continued)

*Primary Examiner* — M Good Johnson
(74) *Attorney, Agent, or Firm* — KPPB LLP

(57) ABSTRACT

Systems and methods for generating a 360 degree mixed virtual reality environment that provides a 360 degree view of an environment in accordance with embodiments of the invention are described. In a number of embodiments, the 360 degree mixed virtual reality environment is obtained by (1) combining one or more real world videos that capture images of an environment with (2) a virtual world environment that includes various synthetic objects that may be placed within the real world clips. Furthermore, the virtual objects embedded within the 360 degree mixed reality environment interact with the real world objects depicted in the real world environment to provide a realistic mixed reality experience.

18 Claims, 21 Drawing Sheets

(51) Int. Cl.
*G06T 15/04* (2011.01)
*G06T 7/30* (2017.01)
*G06F 3/01* (2006.01)
*G06T 7/20* (2017.01)
*G11B 27/031* (2006.01)

(56) References Cited

U.S. PATENT DOCUMENTS

| | | | | |
|---|---|---|---|---|
| 9,566,517 B2* | 2/2017 | Hardy | ................... | G06T 19/006 |
| 2002/0164067 A1* | 11/2002 | Askey | ..................... | G06T 17/20 |
| | | | | 382/154 |
| 2004/0062439 A1* | 4/2004 | Cahill | ....................... | G06T 5/50 |
| | | | | 382/173 |
| 2009/0129630 A1* | 5/2009 | Gloudemans | ........... | G06T 15/20 |
| | | | | 382/103 |
| 2010/0182340 A1* | 7/2010 | Bachelder | ............ | G02B 27/017 |
| | | | | 345/633 |
| 2012/0236029 A1* | 9/2012 | Newhouse | ....... | H04N 21/41407 |
| | | | | 345/633 |
| 2013/0093787 A1* | 4/2013 | Fulks | ..................... | G06T 11/60 |
| | | | | 345/629 |
| 2013/0113827 A1 | 5/2013 | Forutanpour | | |
| 2013/0222369 A1* | 8/2013 | Huston | ................... | G06T 17/00 |
| | | | | 345/419 |
| 2014/0228118 A1* | 8/2014 | Hardy | ................... | G06T 19/006 |
| | | | | 463/31 |
| 2014/0306995 A1* | 10/2014 | Raheman | .............. | G06T 19/006 |
| | | | | 345/633 |
| 2015/0170256 A1* | 6/2015 | Pettyjohn | ........... | G06Q 30/0639 |
| | | | | 705/14.49 |

OTHER PUBLICATIONS

Anguelov, Dragomir et al., "Google Street View: Capturing the World at Street Level", IEEE Computer Society, 2010, XP00276065, pp. 32-38.

Breen, David E. et al., "Interactive Occlusion and Automatic Object Placement for Augmented Reality", Computer Graphics Forum, Wiley-Blackwell Publishing Ltd, GB, vol. 15, No. 3, Aug. 26, 1996 (Aug. 26, 1996), pp. 11-22, XP002515919, ISSN: 0167-7055, DOI: 10.1111/1467-8659.1530011 p.6, section "4.2.RealOccludingVirtual:Model-BasedMethod"; fig.5.

Cote, Stephane et al., "Live Mobile Panoramic High Accuracy Augmented Reality for Engineering and Construction", Proceedings of the 13th International Conference on Construction Applications of Virtual Reality. Oct. 30-31, 2013, London, UK, pp. 262-271.

* cited by examiner

SYSTEMS AND METHODS FOR GENERATING 360 DEGREE MIXED REALITY ENVIRONMENTS

CROSS-REFERENCE TO RELATED APPLICATIONS

This application claims priority to U.S. Provisional Application No. 62/183,540 filed Jun. 23, 2015, entitled "Systems and Methods for Generating 360 Degree Mixed Reality Environments", the disclosure of which is incorporated herein by reference.

FIELD OF THE INVENTION

The present invention generally relates to computer simulation software for mixed reality and in particular to systems and methods for visualizing synthetic objects within a 360 degree view of an environment generated from real-world video.

BACKGROUND

Mixed reality refers to the mixing of the real world, as depicted by video clip, with a virtual world to generate an environment in which real world and virtual world objects interact in real-time. For example, in a fitness gaming application, virtual avatars representing human runners may be embedded within a video, clip or live stream, that depicts an actual outdoor running environment, and the interaction of the virtual avatars through the real world environment provides a user with a realistic experience as though the user, displayed as the virtual avatar, is able to move and interact with the real-world environment in a realistic manner.

SUMMARY OF THE INVENTION

Systems and methods for Generating 360 Degree Mixed Reality Environments in accordance with embodiments of the invention are disclosed. In one embodiment, a system for visualizing controllable virtual 3D objects within a mixed reality application using real-world video captured from a plurality of cameras, including: a processor; memory including a mixed reality application; and where the mixed reality application directs the processor to: obtain a plurality of real-world videos captured by one or more cameras, each real-world video capturing a different portion of a surrounding real-world environment; for each real-world video, generate a 3D mixed reality environment that includes (1) the real-world video as a background layer of the 3D mixed reality environment, (2) an occlusion layer that includes one or more transparent 3D objects that replicate real-world objects within the real-world video, and (3) one or more virtual synthetic objects, wherein the virtual synthetic objects interact with the transparent 3D objects based on 3D space locations of the objects; and combine at least one 3D mixed reality environment generated for a real-world video with a different 3D mixed reality environment generated for a different real-world video to provide a 3D mixed reality environment that replicates a larger portion of the surrounding real-world environment for use by the mixed reality application.

In a further embodiment, the at least one 3D mixed reality environment generated for the real-world video with the different 3D mixed reality environment generated for the different real-world video includes stitching together frames from the different real-world video clips and combining the background and occlusion layers of each 3D mixed reality environment generated for each real-world video.

In another embodiment, the instructions when executed further configure the one or more processors to combine a plurality of 3D mixed reality environments to provide a complete 360 degree view of the surrounding real-world environment.

In a still further embodiment, the instructions when executed further configure the one or more processors to detect a user changing a view beyond a threshold and rendering a different 3D mixed reality environment generated for a real-world video corresponding to the current view.

In still another embodiment, the instructions when executed further configure the one or more processors to store depth information of real-world objects within a video frame within a subset of pixels of the particular frame.

In a yet further embodiment, the instructions when executed further configure the one or more processors to store motion vectors that describe movement of pixels between frames of video within a subset of pixels within a frame.

In yet another embodiment, a background layer of a 3D environment is one of a plurality of layers synched in the 3D environment.

In a further embodiment again, the instructions when executed further configure the one or more processors to render a different real-world video clip within the background layer when a user changes a direction of a path in the real-world video.

In another embodiment again, the instructions when executed further configure the one or more processors to extract at least one of camera movement coordinates, path coordinates and object coordinates from at least one real-world video to provide depth information used by a 3D environment.

Another further additional embodiment, a non-transitory computer-readable medium containing computer-executable instructions that, when executed by a hardware processor, cause the hardware processor to perform a method for rendering a mixed reality environment, the method includes: obtaining a plurality of real-world videos captured by one or more cameras, each real-world video capturing a different portion of a surrounding real-world environment; for each real-world video, generating a 3D mixed reality environment that includes (1) the real-world video as a background layer of the 3D mixed reality environment, (2) an occlusion layer that includes one or more transparent 3D objects that replicate real-world objects within the real-world video, and (3) one or more virtual synthetic objects, where the virtual synthetic objects interact with the transparent 3D objects based on 3D space locations of the objects; and combining at least one 3D mixed reality environment generated for a real-world video with a different 3D mixed reality environment generated for a different real-world video to provide a 3D mixed reality environment that replicates a larger portion of the surrounding real-world environment for use by the mixed reality application.

In another additional embodiment, the at least one 3D mixed reality environment generated for the real-world video with the different 3D mixed reality environment generated for the different real-world video includes stitching together frames from the different real-world video clips and combining the background and occlusion layers of each 3D mixed reality environment generated for each real-world video.

In a still yet further embodiment, the method further includes combining a plurality of 3D mixed reality environments to provide a complete 360 degree view of the surrounding real-world environment.

In still yet another embodiment, the method further includes detecting a user changing a view beyond a threshold and rendering a different 3D mixed reality environment generated for a real-world video corresponding to the current view.

In a still further embodiment again, the method further includes storing depth information of real-world objects within a video frame within a subset of pixels of the particular frame.

In still another embodiment again, the method further includes storing motion vectors that describe movement of pixels between frames of video within a subset of pixels within a frame.

In a still further additional embodiment, a background layer of a 3D environment is one of a plurality of layers synched in the 3D environment In still another additional embodiment, the method further includes rendering a different real-world video clip within the background layer when a user changes a direction of a path in the real-world video.

In a yet further embodiment again, the method further includes extracting at least one of camera movement coordinates, path coordinates and object coordinates from at least one real-world video to provide depth information used by a 3D environment.

In yet another embodiment again, the virtual synthetic objects interact with the transparent 3D objects based on 3D space locations of the objects such that virtual synthetic objects that are located behind transparent 3D objects based on the 3D space locations of the objects are occluded by the background layer.

In a yet further additional embodiment, the virtual synthetic object is an avatar of a user, wherein the avatar moves based on activities of the user.

DETAILED DESCRIPTION

Figure 1:
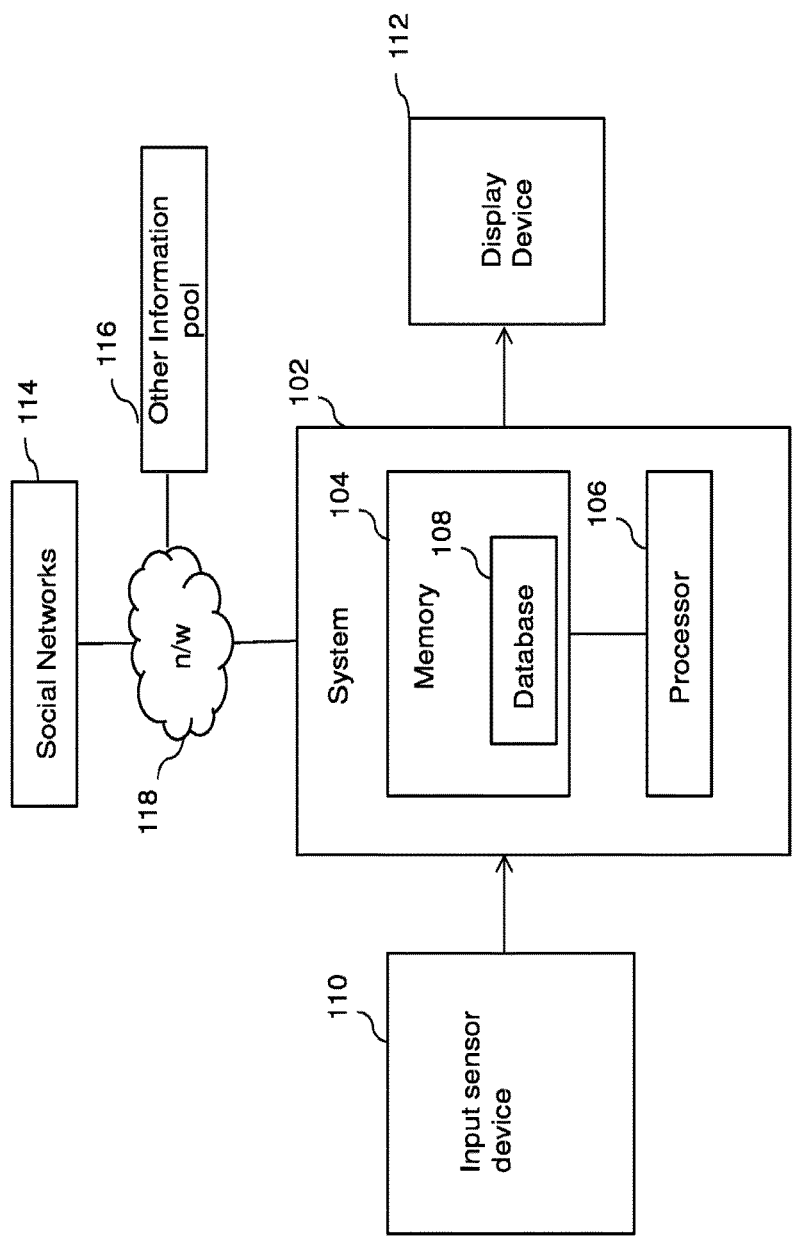
FIG. 1 illustrates an exemplary block diagram of a system for generating a 360 degree mixed reality environment that includes visualizing synthetic objects within one or more real-world videos captured by one or more cameras, in accordance with an embodiment of the present disclosure.

The virtual and real-world interactions in mixed and virtual reality applications may include having the virtual objects interact with obstacles (e.g., trees) and objects (e.g., cars, other runners, etc.) that appear within the real world environment, and also disappearing and re-appearing behind objects, touching objects, moving objects, among many other interactions that together provide a user of the application with a mixed virtual reality experience. Furthermore, with the enhancement in computing power, mixed virtual reality applications may be developed that provide better and more realistic virtual environments.

Providing a mixed reality experience requires the seamless merging of a real world environment, generated using one or more video, captured as clips or obtained from a live video feed, with a virtual world environment. Furthermore, a significantly enhanced mixed reality experience may be achieved by providing a user with the ability to view the mixed reality environment with a complete 360 degree view of the surrounding environment. In particular, a user may be able to change and rotate their viewing direction of the surrounding environment in order to rotate their view towards any and all directions within the surrounding mixed reality environment. This viewing experience is described throughout this application as providing a '360 degree' view of the surrounding environment, including permitting a user to view in any direction, including upwards, down, backwards, forwards, and to the sides, and at any particular angle or viewpoint.

As will be described in detail below, many embodiments of the invention use multiple video cameras to capture a complete 360 degree view of a surrounding environment and use this video to generate a 360 degree mixed virtual reality environment. The video generated from the various cameras may be used by mixed reality systems that use the video to generate a mixed virtual reality environment. Systems and methods for generating a mixed virtual reality environment using a real-world video clip are described in U.S. patent application Ser. No. 14/343,378 entitled "System and Method For Visualizing Synthetic Objects Within Real-World Video Clip", filed on Mar. 6, 2014 and published as U.S. Patent Publication No. U.S. 2014-0228118 A1, the entirety of which is hereby incorporated by reference. The methods for generating a mixed reality environment from a single video source may now be applied to video that is captured from multiple cameras capturing a 360 degree view of an environment, described in detail below. In particular, each 3D environment generated from a video generated by a particular camera (or camera array) may be combined with a different 3D environment generated from a video captured by a different camera, in order to generate a complete 360 degree mixed virtual reality environment.

Turning now to the drawings, systems and methods for generating a 360 degree mixed virtual reality environment that provides a 360 degree view of an environment in accordance with embodiments of the invention are described below. In a number of embodiments, the 360 degree mixed virtual reality environment is obtained by (1) combining one or more real world videos that capture images of an environment with (2) a virtual world environment that includes various synthetic objects that may be placed within the real world clips. Systems and methods for visualizing synthetic objects within real-world video clips are described in the above referenced U.S. patent application Ser. No. 14/343, 378, published as U.S. Patent Publication No. US2014-0228118 A1.

In order to enhance the mixed virtual reality experience generated for a single real world video, also referred to as the "3D environment" particular to the real-world video for which it has been generated, many embodiments of the invention combine mixed virtual environments (i.e., 3D environments) generated from multiple real world videos in order to provide a user with a total 360 degree mixed virtual reality environment that now permits a user to view a complete 360 degree view of the surrounding environment. For example, a user may be able to view a real world environment and provide input that may rotate a viewpoint of the user towards any direction that the user pleases, including looking up, down, backwards, forwards, and to the sides. For example, if the user is viewing an outdoor street environment, the user can look up at the sky, down at the street, to the sides at the buildings, among any other direction that the user chooses.

Furthermore, virtual objects may be embedded within the 360 degree mixed reality environment such that they are able to interact with the real world objects depicted in the real world environment. For example, in a 360 degree mixed reality environment used by a fitness application such as a running track that a user may run through while running on a treadmill, a user may be viewing a particular virtual avatar, corresponding to a different user that is running as well, run past this virtual avatar, and the user may now be able to look in a backwards direction and may be able to see that the virtual avatar is properly being displayed at the appropriate location behind the user. Many embodiments of the mixed virtual reality application compute the appropriate depth information for the real world and virtual world environments in order to be able to provide a realistic experience of the various interactions between the virtual and real-world objects.

In many embodiments, in order to capture real-world video of a complete 360 degree view of a real world environment, the mixed virtual reality system uses one or more real-world videos captured from one or more video cameras, each camera capturing a different subset of the surrounding environment. Certain embodiments may use a single camera with a 360 degree or panoramic type view lens. Several embodiments may utilize one or more array camera configurations, among various other camera configurations as appropriate to the requirements of specific applications in order to capture real-world video of the surrounding environment.

In several embodiments, video cameras with certain types of lenses, including fish-eye, wide angle, and the like may be used to capture the surrounding environment. Accordingly, in order to provide the 360 degree views, the frames from each video camera may be stitched together, along with the various 3D environments generated for each video clip.

In order to combine different 3D environments that have been generated by different video clips, many embodiments of the invention stitch together the frames from the different video clips, and likewise, combine the various other information (e.g., occlusion layer and/or background layer) generated for each 3D environment. The manner in which the frames of each camera are stitched may need to take into account various factors, including the relative displacements of each video camera as it captured an image. Furthermore, certain camera configurations may enhance the capturing of the surrounding 3D environment, by, for example, capturing images at an appropriate height that is near a human eye level when viewing an environment. Various video camera configurations that enhance the capturing of images, including placement of the video cameras at a human eye level, in accordance with embodiments of the invention are described below.

Using and storing video images captured from many different video cameras may require significantly more storage and computing requirements than is typically required for distributing video captured by a single camera. Accordingly, many embodiments of the invention that include systems used to generate 360 degree mixed reality environments may be able to optimize and/or reduce the storage and computing requirements needed for the mixed reality environments by embedding certain information, including motion vector information used for interpolating frames of video and depth information used for generating 2D and 3D videos, either within the video frames themselves, or in a separate file. In particular, some embodiments may store the depth information of the various objects within a video frame in a subset of pixels of the particular frame (and/or in a separate file). Likewise, some embodiments may store the motion vector information describing the movement of pixels between frames of video within a subset of the pixels of the frame (and/or in a separate file). These optimizations may significantly reduce the storage and/or distribution requirements for application of the 360 degree mixed reality environment. Systems and methods for motion-vector-aided video interpolation are described in U.S. patent application Ser. No. 14/503,029, entitled "Systems and Methods For Motion-Vector-Aided Interpolation Using Real-Time Smooth Video Playback Speed Variation," filed on Sep. 30, 2014 and issued as U.S. Pat. No. 9,131,202, the entirety of which is hereby incorporated by reference.
Generating 360 Degree Mixed Reality Environments To generate the mixed reality environment, many embodiments capture one or more video clips of a surrounding environment and use multiple video cameras in order to capture a complete 360 degree view of the surrounding environment. Some embodiments may then generate, for each video captured by a particular video camera, a 3D environment for the particular video that includes synthetic objects (e.g., virtual objects) embedded within the video clip, an overlay layer for controlling the interaction and display of the virtual and real objects, among various other enhancements that together help provide a mixed reality experience to a user. In particular, for a particular real-world video capturing a portion of an environment, the system may generate a real-world video layer as a background layer, and an overlay layer placed on top of the video layer that includes virtual synthetic objects that will be displayed overlaid on the real-world video, thus generating a 3D environment for the particular real-world video. Processes for generating mixed reality environments using a background layer in conjunction with an overlay layer are described in detail below with reference to FIGS. 3A, 3B, 4A and 4B. In many embodiments, one or more of these processes may be repeated for each real-world video being captured by a different video camera capturing a different portion of the total 360 degree surrounding environment.

In particular, the total 360 degree view may be obtained by combining the 3D environments that have been generated for each individual real-world video captured by a particular camera. Furthermore, although the processes below describe combining, or stitching together, the 3D environments generated for different real-world videos in order to generate a complete 360 degree mixed reality environment, other embodiments may use a single video camera that uses a 360 degree view lens to capture the surrounding environment. Certain embodiments may utilize any of a combination of many other different types of lens and/or camera configurations, in order to generate a 360 degree mixed reality environment as appropriate to the requirements of specific applications in accordance with embodiments of the invention. Systems and methods for generating a 360 degree mixed reality environment that is generated using one or more real-world videos in accordance with embodiments of the invention are described below.
Visualizing Synthetic Objects Within Real-World Video Clip As described above, some embodiments of the 360 degree mixed reality system allows for the visualization of synthetic objects within a real-world video captured by a particular video camera (or camera array) pointed at a particular direction, and then combining the different mixed reality 3D environments generated for the different real-world videos captured by different cameras in order to generate a complete 360 degree mixed reality environment. To generate this effect, described as an in some embodiments, the 360 degree mixed reality system may extract information from at least a portion of a real-world video. The extracted information may be processed to form a transparent 3D scene reflecting an entire route travelled by a camera in the real world video. The mixed reality system may further build into the transparent 3D scene at least one of one or more objects and features from the real world video based on the extracted information. The built objects and features may be at least one of static and dynamic based on the real-world video. In several embodiments, the system may visualize, in a 3D player, the built transparent 3D scene and dynamic objects overlaid on a background layer of the real world video. Furthermore, the system may add in the 3D player additional synthetic objects (static or dynamic) within transparent a 3D scene representation of the features in the real world video. The transparent 3D scene representation may be based on the visualization of the built transparent 3D scene. Additionally, the system includes using a 3D transparent layer as an "occlusion" layer. An object or part of the occlusion layer, appearing behind a transparent object, may be occluded and occupying a place with the real-world video. The extracted information (from the real-world video) may be applied to a camera of the 3D player. Moreover, the system includes controlling the movement of the synthetic objects independent from the movement of the real-world video. Lastly, each transparent 3D scene that was generated for each real-world video captured by a particular camera, including the overlay and background layers of the mixed reality environment generated for a particular real-world video captured by a particular camera, may be stitched together with other transparent 3D scenes generated from real-world videos captured by video cameras that may be pointed at different directions of the environment, and together, the combined transparent 3D scenes of the numerous different video cameras may provide a complete 360 view of the surrounding environment.

During playback of the mixed reality environment, as described below, the particular transparent 3D scene that may be displayed by the 3D player may depend on the particular direction that the user is viewing the surrounding environment. For example, after a user turns beyond a certain threshold, the 3D player may change the transparent 3D scene (i.e., 3D environment) to select and display a particular transparent 3D scene generated for a particular real-world video that was captured for the particular direction that the user is now viewing within the 360 degree mixed reality application.

Herein above, interactive synthetic objects or characters may be allowed to appear as if they are "embedded" inside or form part of a video or movie clip however these objects move independently of the landscape or environment within the real-world video and are controlled by a user or other directions. In certain embodiments of the invention, the effect is achieved by setting the video frames as textures in the furthermost layer in a 3D environment viewer or 3D "engine" and controlling the separate and independent movement of the objects by an input device and assigning the 3D movement and field of view settings of the video camera to the 3D application camera to give the perception that only one camera is used. In another embodiment this is achieved by superimposing separate layers of video frames and the synthetic objects or characters on an output screen and syncing the movements and field of view of the 3D environment camera to the video camera to give the perception that only one camera is used.

The resulting effect is that the 3D or synthetic objects appear to be moving within the video landscape, but independent of the movement of the video. For example, in several embodiments the video may have been recorded from a moving vehicle driving forward at a speed of 10 km/hr on a street. An object or character could appear to run in front of the vehicle and camera, stop a certain distance in the front, turn around, act out a scene, then run backwards out of sight around the corner. The 3D object can be controlled independently by a user of the "game" or application and the 3D interaction and representation can be different every time the same section of video is viewed.

In several embodiments, the technology may be used as a fitness entertainment game or simulation. Movement of the users during the exercise activity may be walking, running or rowing using a treadmill, indoor cycle, elliptical, rower or other equipment. The movement may be transmitted to the application using a sensor that tracks the activity on the machine. The user's activity may also be a regular outdoor movement. In this case sensors on the body of the user track the movement type and intensity.

For the purposes of descriptions of various embodiments described below, the term "3D" is used in referring to common video gaming objects or software, which can be viewed from multiple angles or aspects, not necessarily the stereoscopic visual method (e.g. using 3D glasses) of displaying separate video feeds to give the impression of depth. Therefore 3D development software may refer to software such as, but is not limited to, Autodesk Maya, Autodesk 3DsMax, Cinema 4D and others. 3D objects or 3D scene would refer to objects created in such types of software packages. Furthermore, this application describes certain optimizations that may reduce the storage requirements for certain depth information used to display "3D" video as the term "3D" is typically used to refer to video that appears in 3 dimensions to a user.

As summarized above, the present invention is directed to video games and computer simulations that may use one or more real world videos in building the background to other interactive moving or static characters which are intended to appear as if they exist, appear or move within the environment depicted in the video. In the case of the invention, the 3D effects are designed to create an interactive real-time gaming environment that may enable a user to see 3D or synthetic and gaming and other (HTML, flash, etc.) events that may happen within the real world video in real time.

In several embodiments, the core application is an interactive 3D-enabled media player/viewer that incorporates a gaming engine. The viewer application may allow interactive 3D objects to appear as if they are "embedded" into but move independently of a landscape or environment within a real-world video that in turn may adapt to the users activity.

A screen placed in front of machines along with some form of processor may host a software application with video games that may be triggered by the user's exercise motions, and one that interacts with other users live during the game or simulation, shares (sends and receives) information across social networks and online. The application may also store and analyze data about the users' performance and provide a graphical representation of the user's performance for motivating the user. Further, the user may be facilitated to post their performance's representation on social networks such as Facebook, LinkedIn, Twitter and the like.

In certain embodiments, video frames may be shown to the user as the furthermost layer in the 3D environment. Individual frames, when called, are read from disk, decompressed into memory, sent to the 3D video Card memory, and then drawn on the screen as textures on an object that may be the back layer of the 3D environment. The timing that may direct this process may be customized to allow for a more realistic and ultra-smooth video playback experience. On multi-core hardware systems, each video frame may also be rendered in separate sections in each core, enabling the system to achieve extremely efficient performance rates (e.g. 60 fps HD video) with an additional and separate full layer of 3D gaming objects and online live multiplayer connection.

Referring now to FIG. 1 that depicts an exemplary block diagram of a system for generating a 360 degree mixed reality environment that includes visualizing synthetic objects within one or more real-world videos captured by one or more cameras, in accordance with an embodiment of the present disclosure. As shown, a system 102 may include, but is not limited to, a memory 104 and a processor 106 coupled to the memory 104. The memory 104 may include one or more instructions that may be executed by the processor 106 to visualize synthetic objects within real-world videos. In some embodiments, a real-world video may be real-world video clips that were previously captured by one or more cameras. In several embodiments, the real world video may be video obtained during a live feed, a streaming video, among any of a variety of other mechanisms through which real-world video may be captured and generated. In an embodiment, the instructions (stored in the memory 104) may enable a user to utilize a system to render a visual game or simulation of one or more activities performed by the user.

The memory 104 may further include a database 108 to store one or more instructions and information corresponding to the user. The information corresponding to the user may include, but is not limited to, personal information, activities information, and one or more video files and other information, such as rules, for visualization of synthetic objects. The database 108 and corresponding information will be explained further in this disclosure.

In an embodiment, the system 102 may be utilized with other devices as an individual application. For example, as shown, the system 102 may be connected to an external device, such as an input sensor device 110 that may utilize the system 102 to implement the functionality of rendering game or simulation of one or more activities that may be performed by the user on such input sensor device 110. In an embodiment, the input sensor device 110 may include, but is not limited to, a fitness machine such as treadmill, a rower, a cycle and the like.

The input sensor device 110 may have one or more sensors to determine activities of the user. For example, the input sensor device 110 such as a treadmill may measure various characteristics corresponding to activities/movements performed by the user. These characteristics may be provided as an input to the system 102. The input (information corresponding to user's activities) may be utilized by the system 102 in rendering visual games or simulation of one or more activities within a real-world video (explained further). Further, the system 102 may provide one or more real-world videos that provide a 360 degree view of a surrounding environment, with controllable synthetic objects embedded therein as an output to an external display device 112.

In another embodiment, the system 102 may be a computer system that may be implemented to provide the functionality of visualizing synthetic objects within a 360 degree mixed reality environment generated from one or more real-world videos. For example, the system 102 may by a device for rendering visual game or simulation of one or more activities of a user utilizing the system 102. In this embodiment, the system 102 may be implemented in any suitable hardware component that may have one or more sensors to sense the user's activities (without requiring any additional device) to provide dynamism to synthetic objects that may be embedded in the real-world video. The device (that implements the system 102) may have an inbuilt display device to provide real-world video with synthetic objects that may be controlled independently based on the movements of the user utilizing the device. Here in this embodiment, the display device 112 may be considered inside the system 102.

Further, the system 102 may be connected to one or more social networks 114 and other online information pool 116 through a communication network 118. The network 118 may be wireless network such as the internet or other wide area network. The system 102 may tag the user with his/her information and provide information to the user corresponding to the performance of the user in performing the activities (exercising, playing games and the like). The system 102 may enable the user to post the activities, performance status on the social networks 114 or on other information pool 116 (such as blogs, websites and the like) through the network 118. Further, the user may receive replies from other users in response to the posting done by the user on the social network 114.

In certain embodiments, the system 102 may be connected to other devices for enabling the user to interact with other users using the other devices. For example, a user may connect and compete with other users (performing fitness activities or playing a common game) using other devices (exercise machine or gaming system) locally or word wide. This may enhance motivation among the users to perform fitness activities and yet remain entertained by interacting with the other users.

The memory 104 may include instructions that may be executable by the processor 106 to render a visual game or simulation of one or more activities. The instructions may be a part of various software modules (not shown) that may be implemented by the system 102 to carry out particular functionalities. The system 102 may select one or more real-world video files that may be one or more recorded files of the real world location for visualization. The instructions may enable the user to select one or more real-world video files that may be provided as options to the user. In an embodiment, the real world video files may be stored in the memory 104 of the system 102. Alternatively, the user may be allowed to select an external recorded video file that may be stored in a personal file or folder of the user in the system 102.

In an embodiment, one or more video files may be recorded moving through an environment at constant or varying speeds, each video file capturing images of a portion of the total surrounding environment, and to cover locations to be used in a video game or simulation. Further, the video files may cover significant distances. Furthermore, length of the video files may be from a few seconds to a few hours. In an embodiment, the length of the video files, and the location covered within it, may be determined by users of the video game or technical simulation.

Further, in an embodiment, the video files may be a compilation of several locations that may be used in the video game or simulation. The video files may also contain different and multiple views of the same location that may allow users or players of the game or simulation, options during game play to choose different routes, and to rotate views to look in any and all directions within the surrounding environment.

The system 102 may utilize an extraction module (not shown) having instructions that may be executable by the processor for extracting camera information from each real-world video file (hereinafter referred to as 'video file'). The camera information may include camera movement coordinates information, camera direction information (e.g., the portion of the total 360 surrounding environment being captured by the particular camera), path coordinates information from the video file, and point cloud coordinates information for each frame of the video file. The camera movement coordinates information may include movement of a video camera at each frame relative to static points shown in video images. Further, the point cloud coordinates information may include depth of objects (or distance from lens of the camera) shown in the video file. The camera information may be stored in the memory 104 and may be translated into 3D coordinates. In an embodiment, the stored information may be merged to form a background scene in a 3D environment.

Further, the system 102 may add an occlusion layer in the 3D environment that may include a transparent 3D replica of key objects depicted in the video file. The transparent 3D replica of static features or additional static features may be built, and further existing features from the video file may be refined. In an embodiment of the invention, 3D space locations of objects depicted in the video may be automatically generated based on the point cloud information, and the occlusion layer may be automatically generated either from the 3D space locations of the objects (depicted in the video file) or from the point cloud information.

The transparent occlusion layer may be used by the system 102 to hide any object that may appear behind the transparent occlusion layer (or transparent object). The occlusion layer is explained in detail further in conjunction with FIG. 33. The transparent 3D representation of occlusion layer and moving objects may be visualized in a 3D player or other viewer application. The transparent 3D scene may be provided to the user for providing further facilities to the user. The transparent 3D scene may be referred to as a background scene in a 3D environment that may be provided to the user for further modifications therein. For example, the system 102 may allow the user to modify the transparent 3D layer further by embedding objects (static or dynamic) therein.

The user may be facilitated to select an avatar or embed a character/avatar for representation of the user in the 3D environment (background scene/transparent 3D environment) that provides a 3D view of the real-world video file (selected earlier by the user). The system 102 may provide one screen visual representation of the user as the avatar in the 3D environment (created based on the video file(s) selected by the user).

In one embodiment of the invention, the system 102 may include a viewer module (not shown) having instructions that may process the selected video file(s), camera movement and rotation information, 3D "occlusion" static and moving objects, relative movement and rotation paths and any other 3D objects, characters (such as the user's avatar) or assets. In an embodiment, the viewer module (having viewer application) may be a custom software application. In another embodiment, the viewer application may be an appropriate video "game engine" or software that may allow viewing of 3D objects and the programming of rules of a game, simulation or other activity. Further, in yet another embodiment of the invention, a standard 3D development application may be used. Examples of these applications include, but are not limited to, Autodesk Maya, Autodesk 3DSMax and Cinema 4D.

The video files and 3D objects may be rendered as separate layers that may be managed independently. The video files may include transparent 3D layers without having 3D objects like avatars. The different 3D objects may be shown in their correct relative location in 3D space by the viewer module. In an embodiment of the invention, the 3D objects may be rendered on a top layer and a video frame may be rendered on furthermost layer of the space. The transparent 3D objects and the moving objects may be visualized overlaid on a background layer of the video file.

The system 102 may execute instructions to display real-time movement of the user in the 3D environment through the selected avatar based on one or more activities performed (by the user) corresponding to at least one of playing the visual game and exercising. For example, the user may be shown, as an avatar, on a 3D environment (of the video file) showing a 3D landscape having objects embedded therein. The user's avatar may be functioning independently of the 3D environment of the video file.

It may be appreciated by a person skilled in the art that even though the user's avatar may be working independently of the environment's objects, the activities (such as running) may be represented in synched with the 3D environmental objects of the video file. In one embodiment, the 3D space camera movements may be synched to match the movements of correct frames from the video clip. The video file and the 3D objects may be rendered on screen in separate but synched layers, in the 3D environment. For example, if it is represented that initially the user's avatar is moving straight on a road (corresponding to the video file) and then, based on traffic of the vehicles or presence of any object (on the way of the user's avatar) in the 3D environment (background scene), the direction of the user's avatar may be changed accordingly so as to avoid hitting with any of the other objects of the 3D environment.

Additionally, the system 102 may provide an HTML browser layer that may be displayed on the display screen of the display device 112. This layer may enable placement of objects containing advertisements, images, video files in a way to give appearance that these objects exist in the environment of the video file. Further, the system 102 may provide many additional features as appropriate to the requirements of specific applications.

Figure 2:
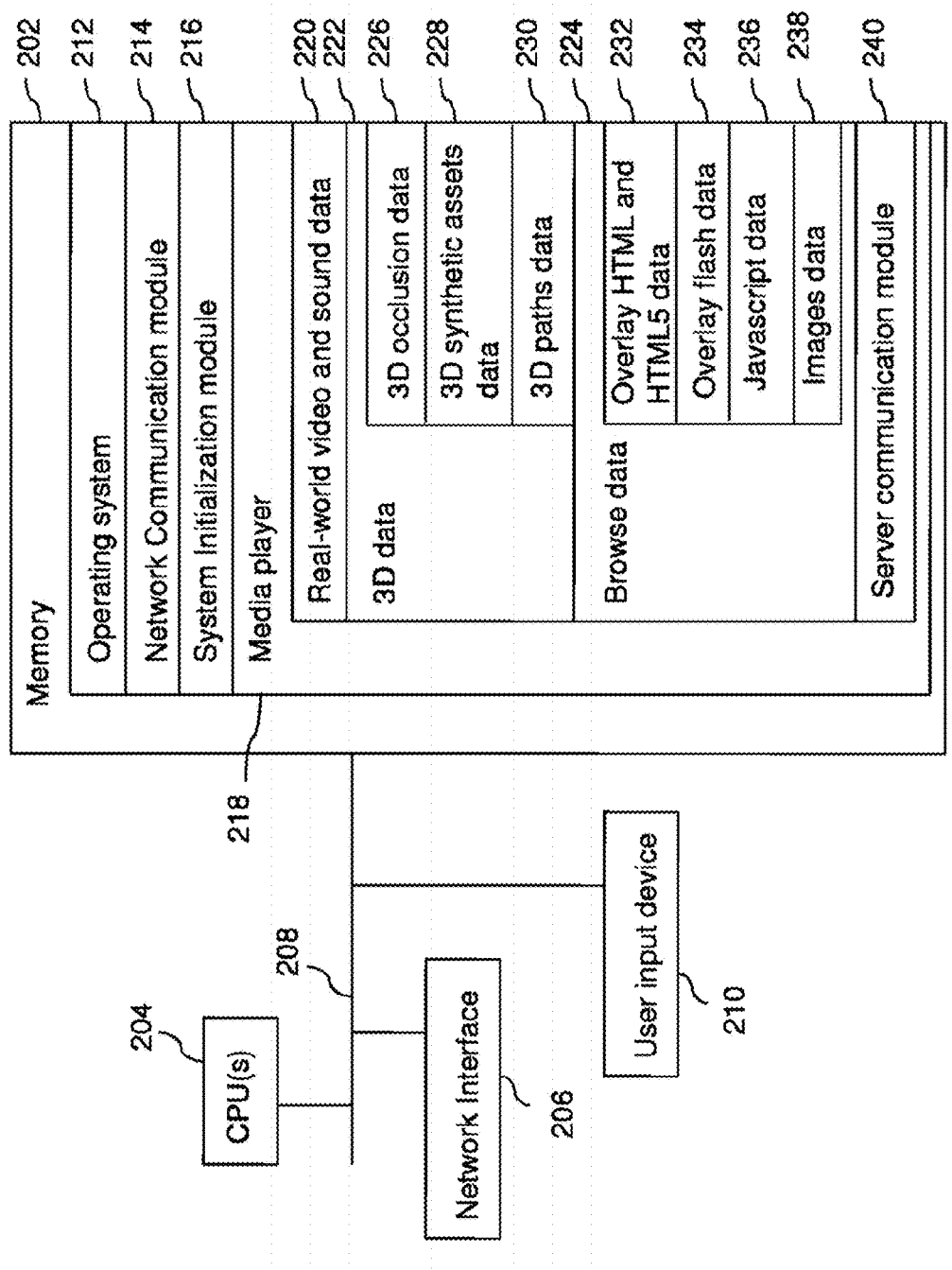
FIG. 2 illustrates a system for generating and displaying a 360 degree mixed reality environment in accordance with an embodiment of the invention.

Referring now to FIG. 2 depicting an exemplary block diagram of a system for generating and displaying a 360 degree mixed reality environment in accordance with an embodiment of the invention. In an embodiment, the system may be implemented in a client computer. As shown, the client computer may include various components, such as, but are not limited to, a memory 202, one or more processing units (CPU's) 204, one or more network or other communications interfaces 206 and one or more communication buses 208. The communication buses 208 may be used for interconnecting the components of the client computer. The communication buses 208 may include circuitry (may interchangeably be referred to as 'chipset') that may interconnect and control communications between the components.

Further, the client computer may include one or more user input device(s) 210, such as, but are not limited to, a display, a keyboard, and other possible interfaces such as a remote control, a USB wireless receiver or a remote sensor. The memory 202 may include, but is not limited to, high speed random access memory and may also include non-volatile memory, such as one or more magnetic disk storage devices. In some embodiments, memory 202 may store one or more programs, modules and data structures, or a subset or superset thereof. The program and modules of the memory 202 may include, but are not limited to, an operating system 212, a network communication module 214, a system initialization module 216, and a media player 218.

The operating system 212 may include procedures for handling various basic system services and for performing hardware dependent tasks. The network communication module 214 may be used for connecting the client computer to other devices (such as personal computers, laptops, smartphones, and the like) via one or more communication networks (wired or wireless), such as the Internet, other wide area networks, local area networks, metropolitan area networks, and so on. Further, a system initialization module 216 may initialize other modules and data structures stored in the memory 202 and required for the appropriate operation of the client computer.

Further, the media player 218 may include, but is not limited to, a real world video and sound data 220, 3D data 222 (or 3D environment viewer and data 222), and browser data 224. The real world video and sound data 220 may be accessed by the media player 218. The 3D data 222 may include 3D transparent occlusion data and files 226 for the landscape environment and moving objects corresponding to the real-world video data 220. Further, the 3D data 222 may include 3D synthetic assets data files 228 that may include avatars or characters representing users or participants within the environment or other additional synthetic objects to be used within the game or simulation. Furthermore, the 3D data 222 may include 3D paths data 2 that may be used to guide the moving synthetic objects within the environment and to help enable the avoidance system.

Further, the browser data 224 may include an Overlay HTML and HTML5 data 232, an Overlay Flash data 234 a JavaScript data 236, and an image data 238. The Overlay HTML and HTML5 data 232 may be utilized by the system including menu, mapping, advertising, scoring, etc. Further, the Overlay Flash data 234 may be for systems including systems including menu, mapping, advertising, scoring, etc. The JavaScript data 236 may be utilized for communication and control between the browser layer 224 and the media player 218. Further, Images data 238 may be utilized for the HTML and Flash systems.

Additionally, a Server Communication Module 240 may allow access to the media player 218 through the Network Communication Module 214 by a centralized server and software enabling connection between multiple players or users and their respective client computers.

The client computer, as described above, may implement a system, such as the system 202, to visualize synthetic objects within a real-world video. The system may enable a user of the client computer to control movements of synthetic objects independently from the movement of the video.

Generating Mixed Reality using Real-World Video

Figure 3A:
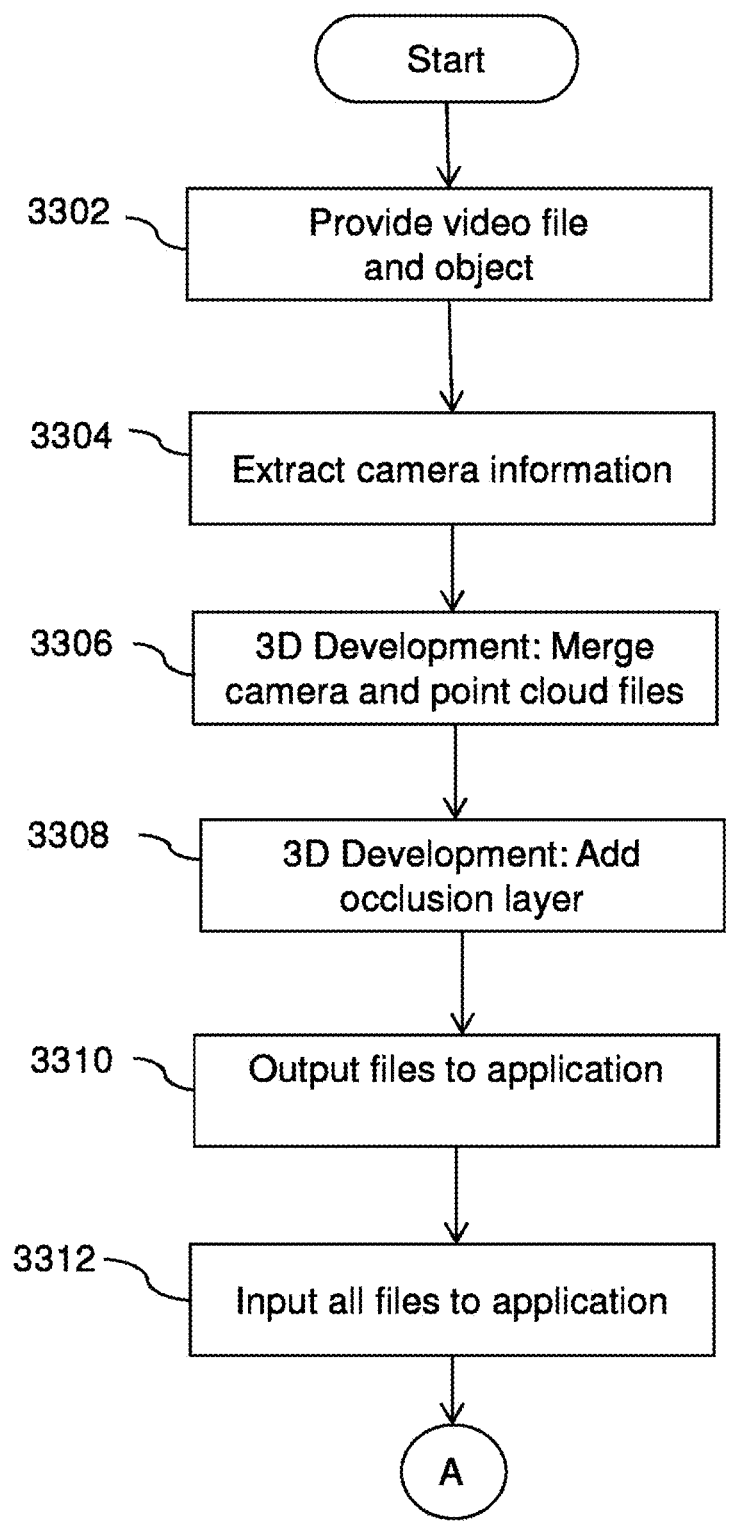
FIG. 3A illustrates a process of visualizing synthetic objects within a real-world video in accordance with an embodiment of the invention.
Figure 3B:
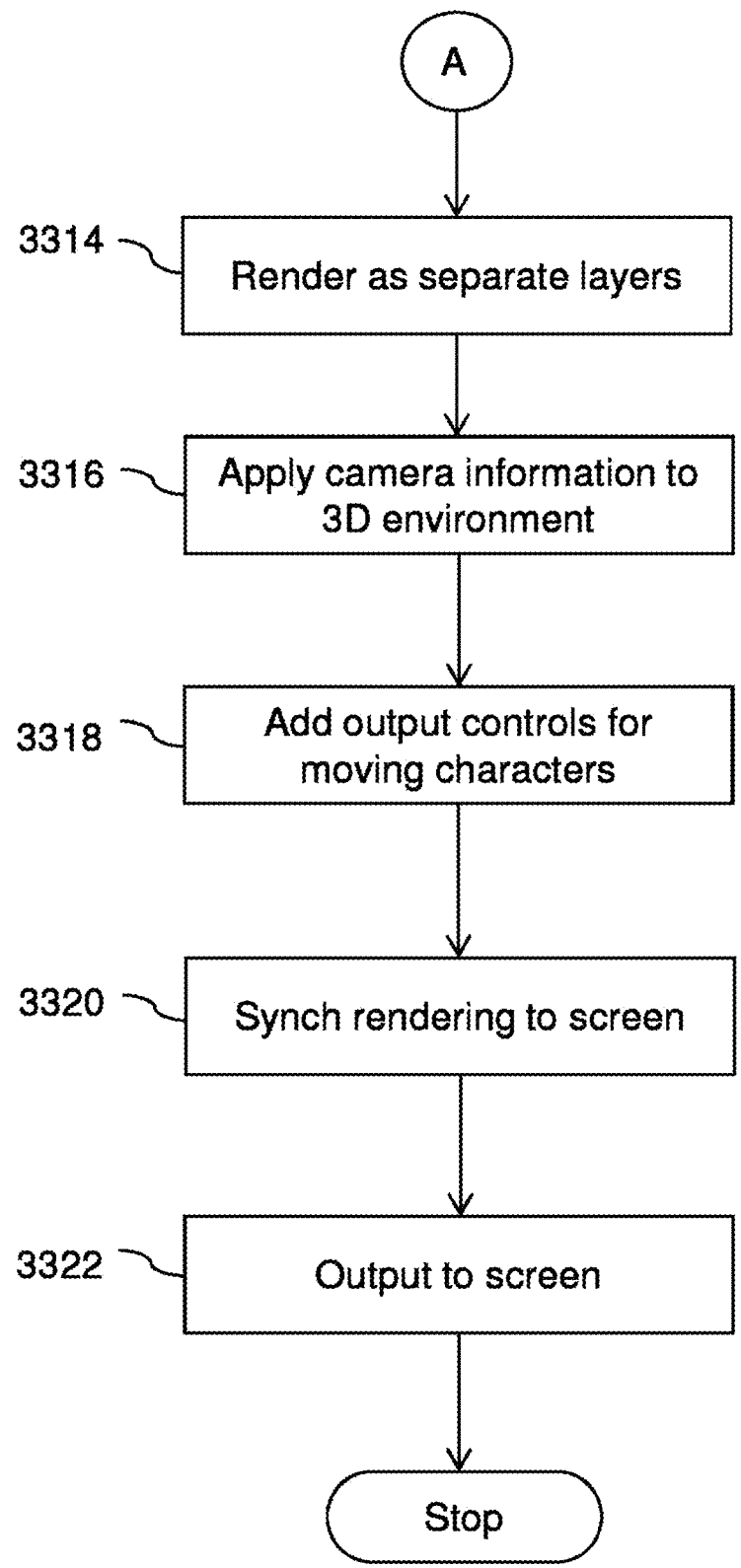
FIG. 3B illustrates a process of visualizing synthetic objects within a real-world video in accordance with an embodiment of the invention.

As described above, many embodiments generate a 3D environment for each real world video being captured by a camera capturing a portion of the surrounding environment, and combine the 3D environments in order to generate a 360 degree mixed reality environment. FIGS. 3A and 3B illustrate a method 3300 of visualizing synthetic objects within a real-world video are illustrated. As describe above, this process may be repeated for each real-world video that is capturing a particular portion of the total 360 degree surrounding environment in order to generate the 360 degree mixed reality environment.

At 3302, a video file and a 3D object (or 3D objects) may be provided. In several embodiments, the video file may be a recording of a real world location and/or a live video feed of a real-world location. In certain embodiments, the video file captures a portion of the surrounding environment. For example a video camera may be pointed in a forward direction to capture images that would appear in front of a user moving through the environment. A different video camera may be pointed at the sky to capture a video clip of the portions of the environment that would appear above the user as the user moves through the environment.

Furthermore, the video file may be recorded moving through the environment at constant or varying speeds to cover locations to be used in a video game or simulation. Further, the video file may cover significant distances. Furthermore, length of the video file may be from a few seconds to a few hours. Next, the length of the video file, and the location covered within it, may be determined by users of the video game or technical simulation.

Further, in an embodiment, the video file may be a compilation of several locations that may be used in the video game or simulation. The video file may also contain different and multiple views of the same location, which may allow players or users of the game or simulation, options during game play to choose different routes and to view any and all directions of the surrounding environment (i.e., 360 degree view).

At 3304, camera information may be extracted from the video file. The camera information may include camera movement coordinates information, path coordinates information from the video file, and point cloud coordinates information for each frame of the video file. The camera movement coordinates information may include movement of a video camera at each frame relative to static points shown in video images. Further, the point cloud coordinates information may include depth of objects (or distance from lens of the camera) shown in the video file.

The camera movement coordinates information, path coordinates information, and the point cloud coordinates information may be extracted for each frame of the video file. Further, the camera movement coordinates information and the point cloud coordinates information may be translated into three dimensional (3D) coordinates. In another embodiment, extraction of the camera movement coordinates information and the point cloud coordinates information and translation of the camera movement coordinates information and the point cloud coordinates information into three dimensional coordinates may be performed together in a single step.

Further, the camera movement coordinates information and the point cloud coordinates information may be stored in a file. The files may be of multiple formats. In certain embodiments of the invention, the format of the file may include native format utilized by the extractor module. In another embodiment of the invention, the camera information may be stored as ASCII or binary text files. The ASCII or binary text files may include frame number, "X, Y and Z" camera coordinates rotation information. The ASCII files may further include reference numbers for each point in the "cloud" along with X, Y and Z 3D space coordinates information for each respective point, in the case of "point cloud" data.

In several embodiments, the camera information may be extracted by an extractor module (not shown in the FIGS.) stored in the memory 104. In certain embodiments, any other module or software application may be used to extract the camera information. Examples of possible software applications may include, but not limited to, SynthEyes, PFTrack, Boujou, Nuke, or Adobe AfterEffects. In several embodiments, a custom software application may be developed that may extract similar camera movement information using analysis of the movement of pixels in the video images between individual frames. Further, a sensor may be used during the recording of the video file.

In several embodiments, the camera movement coordinates information and the point cloud coordinates information may be extracted semi-manually, by visually estimating movement of the video camera at each frame relative to static points shown in the video images. For example, a technician may manually mark the same points on objects (for example, a corner of a house, a trunk of a tree), which appear in different video frames, and the extractor module may estimate relative movement of the camera between those frames.

Further, in certain embodiments, the video file may be cut into smaller sections to allow accurate estimation and extraction of the camera information. Those skilled in the art will appreciate that this may facilitate solving complicated mathematical calculations related to calculation of coordinates. Further, this may facilitate utilization of some systems that may accurately calculate coordinates for a limited number of video frames at one time.

At 3306, the camera movement coordinates information files and the point cloud coordinates information files may be merged, if the video file was cut or edited into smaller clips. The merged files may represent entire route travelled and entire environment captured in the entire video file.

Further, in certain embodiments of the invention, a match may be performed for points in the point cloud coordinates information and the camera movement coordinates information with respective points in the video frames for the entirety of the video file. The degree of accuracy may depend on degree of accuracy required by the final game or simulation.

In several embodiments of the invention, the camera movement coordinates information files and the point cloud coordinates information files may be merged by a developer module stored in the memory 104. In certain embodiments, the camera movement coordinates information files and the point cloud coordinates information files may be merged by some other module.

At 3308, an occlusion layer may be added. In many embodiments of the invention, the occlusion layer may include a transparent 3D replica of key objects depicted in the video file. The transparent 3D replica of static features or additional static features may be built, and further existing features from the video file may be refined. In certain embodiments of the invention, 3D space locations of objects depicted in the video may be automatically generated based on the point cloud information, and the occlusion layer may be automatically generated from the 3D space locations of the objects depicted in the video file. In several embodiments of the invention, occlusion layer may be automatically created from the point cloud information.

Further, in many embodiments of the invention, the transparent Occlusion Layer may be used as a guide for any 3D objects or any additional characters to appear to move within the same environment as the objects depicted in the video file. In certain embodiments, if any object or part thereof which appears behind a transparent object is occluded, and its place is occupied with the video file so that the object appears to be behind the feature in the video file. For example, if a video contains a road which climbs up a hill then turns to the right past a house, a transparent 3D representation of that road, hill and house would serve as a guide to a moving avatar or character placed on a path to appear to walk up the hill, then disappear behind the house. The transparent 3D house may occlude the avatar (i.e. prevent it from being rendered on screen) when it passes behind the 3D house (i.e. further from the viewer in 3D space). Instead of the avatar, the viewer may see the background layer, which is a video image of the house. Therefore, when viewed from the correct angle, and when the 3D transparent house is aligned to fit exactly on the spot in the video frame where a house is depicted, the visual effect to a viewer may be that the avatar has disappeared behind the house shown in the video.

In several embodiments, the Occlusion Layer may also be a number of separate, individual 3D objects or sets of objects or files which have relative coordinates in the same 3D space. In certain embodiments, the Occlusion Layer may include objects which change location in the real world video. Examples of these objects may include moving cars or other vehicles, people or animals or any other objects which may have movement that is different relative to the camera to the static environment shown in the video file.

In certain embodiments of the invention, the moving objects may be generated as transparent 3D occlusion objects. Their relative location at each frame may be set and guidance given for their movement and rotation to match the movement of the objects they depict in the video file. The moving objects or features may be developed from the video file, and further, accompanying animation that matches the movement of objects in the video file. Further, movement paths may be generated for the moving objects. In another embodiment, 3D space locations of the moving objects depicted in the video file may be automatically generated.

In several embodiments of the invention, the occlusion layer may be added by the developer module. In another embodiment, the occlusion layer may be generated by the technician. In yet another embodiment, the occlusion layer and other moving occlusion objects that guide the on screen location coordinates for the characters may be developed using some other module, software application and technologies. For example, the 3D spatial data representing the environment in the video file may be generated at the same time as the video recording, using technologies such as LIDAR (Light Detection And Ranging), LADAR (Laser Detection and Ranging) or other motion sensing input devices or other 3D reconstruction technologies such as Microsoft Kinect or other similar processes which can generate in real time depth information of surrounding objects in an environment.

At 3310, a transparent 3D representation of the landscape (Occlusion Layer) and the moving occlusion objects may be outputted. In certain embodiments, the developer module may output the transparent 3D representation of the landscape (Occlusion Layer) and the moving occlusion objects. Further, these files may be saved and outputted in any one of numerous formats. The files may include data for a size, shape and relative location in 3D space of the static and moving objects.

At 3312, the output files from the developer module, along with the video file may be inputted into a viewer module (not shown in the FIGS.) stored in the memory 104. In several embodiments of the invention, the video file(s), camera movement and rotation information, 3D "occlusion" static and moving objects, relative movement and rotation paths and any other 3D objects, characters or assets are used as input in the viewer module. In an embodiment, the viewer module may be a custom software application. In another embodiment, the viewer application may be an appropriate video "game engine" or software which allows viewing of 3D objects and the programming of rules of a game, simulation or other activity. Further, in yet another embodiment of the invention, a standard 3D development application may be used. Examples of these include Autodesk Maya, Autodesk 3DSMax, Cinema 4D amongst others.

In another embodiment, native file formats of the developer module may be directly inputted into the viewer module. In yet another embodiment, a custom file format may be written specifically for a more efficient transfer of this information to the viewer module. Hence, steps of 3310 and 3312 may be combined into a single integrated step.

At 3314, the video file and 3D objects may be rendered as separate layers. In certain embodiments, 3D objects may be 3D players or avatars of users participating in a game. The different 3D objects may be shown in their correct relative location in 3Dspace. In an embodiment of the invention, the 3D objects may be rendered on a top layer and a video frame may be rendered on furthermost layer of the space. The transparent 3D objects and the moving objects may be visualized overlaid on a background layer of the video file.

Further, in an embodiment, individual frames of the video file may be rendered as textures on the object in the furthermost layer, and further the textures are changed at adjustable rates to simulate a standard video player. For example, the speed of changing of the texture files may be adjusted from zero frames per second (FPS) to rates of 60 FPS and higher to achieve a high rate of control over the speed of movement through the video clip. Further, sounds associated with the video file may be adjusted to change length but not pitch during any changes in the video file playback speed.

Further, the next layer may contain the occlusion layer and the other 3D objects, characters, or assets. Additional synthetic objects, static or moving, may also be added, within the transparent 3D objects representation of the features in the video file. In several embodiments of the invention, there may be additional layers in between or in front of the Occlusion Layer which serves as a location for other game features such as menus or additional information.

At 3316, camera information may be applied to 3D environment. In certain embodiments, the camera movement coordinates information which was extracted from the original video file may be applied to the objects in the 3D space by the viewer module. In an embodiment, the camera information may be applied by the viewer module.

At 3318, output controls for moving 3D objects or characters may be added. The movement of the synthetic objects or 3D objects may be controlled independent from movement of the video file through the output controls. In one embodiment, external controls for the movement/changing of the video frames or movement of the characters or 3D assets of the game or simulation may be incorporated. In certain embodiments, the output controls may be added by the viewer module.

At 3320, the video file may be synched with the 3D objects or moving characters. In certain embodiments, the 3D space camera movements may be synched to match the movements of correct frames from the video clip. The video file and the 3D objects may be rendered on screen in separate but synched layers, in the 3D environment. In an embodiment, the video file may be synched with the 3D objects by the viewer module.

Further, an HTML browser layer may be displayed on the same screen. Furthermore, placement of objects containing advertising images, objects or video files may be placed in a way that gives appearance that they exist in the environment depicted in the video file. In an embodiment, the video file and 3D objects may be rendered by the viewer module.

Furthermore, features or functions may be added that may allow objects resembling doorways or portals to be placed in a way that gives the appearance that they exist in the environment depicted in the video file and that these doorways or portals represent a change in location in the video file.

Further, video game functions may be added that may be used over the video file. In an embodiment, the video game functions may include point systems, characters, and sound effects. Further, the video game functions may include function for allowing the background video or video file to be changed if the user chooses to change the direction of the route and in the process a large, virtual world can be built in which the background is video, not images or textured 3D objects.

At 3322, output may be presented on a screen. In several embodiments, the 3D layers may be rendered as 2D output to a screen for the participating user of the video game or simulation. In another embodiment, the output of the viewer module may be 3D stereoscopic on an appropriate viewing monitor. The 3D objects or synthetic objects may appear to exist or move within the landscape depicted in the video file for a participating user or viewer of a simulation or video game. Further, the synthetic objects or characters may be controlled independently by a player, user or other controlling devices.

Figure 4A:
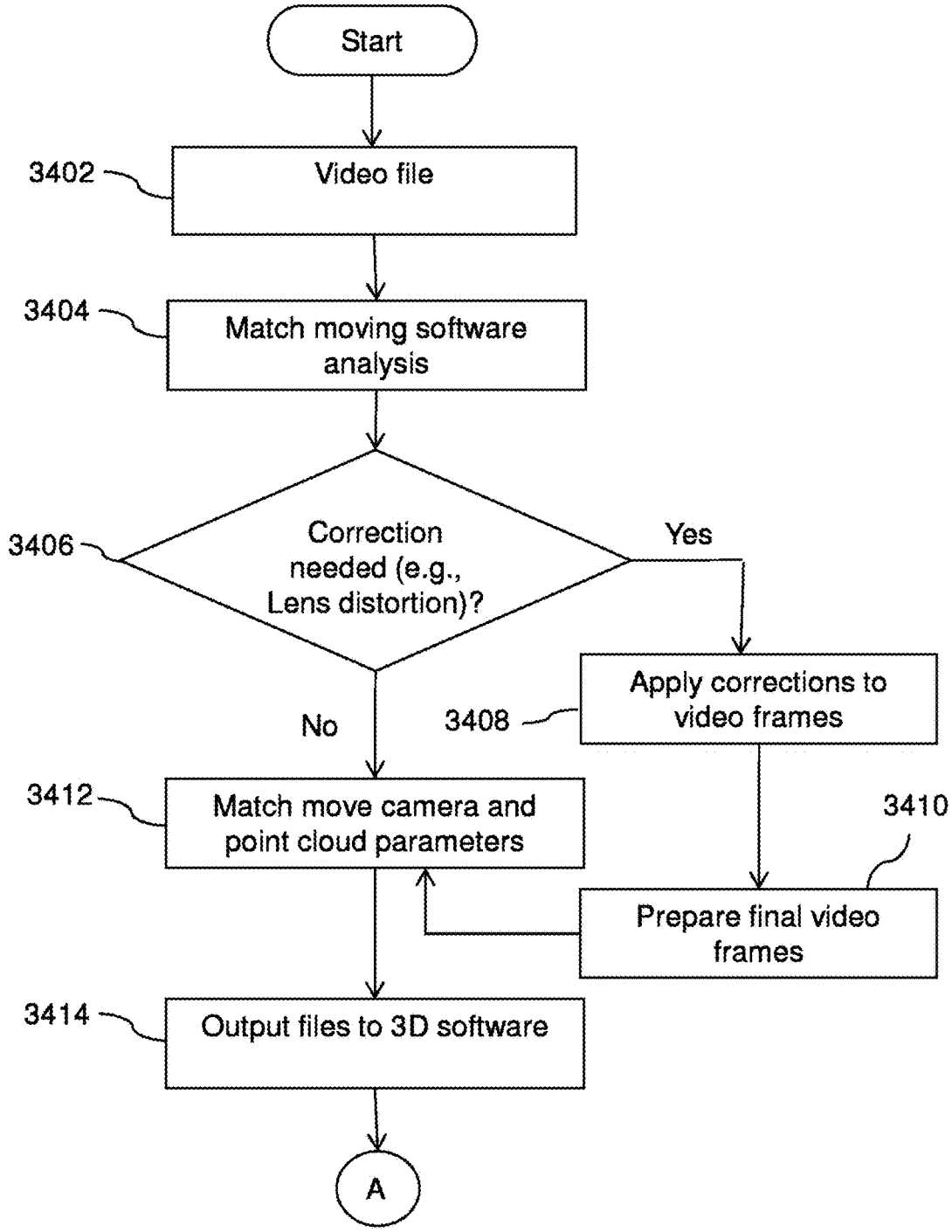
FIG. 4A conceptually illustrates a process for generating and visualizing synthetic objects within a mixed reality environment in accordance with an embodiment of the invention.
Figure 4B:
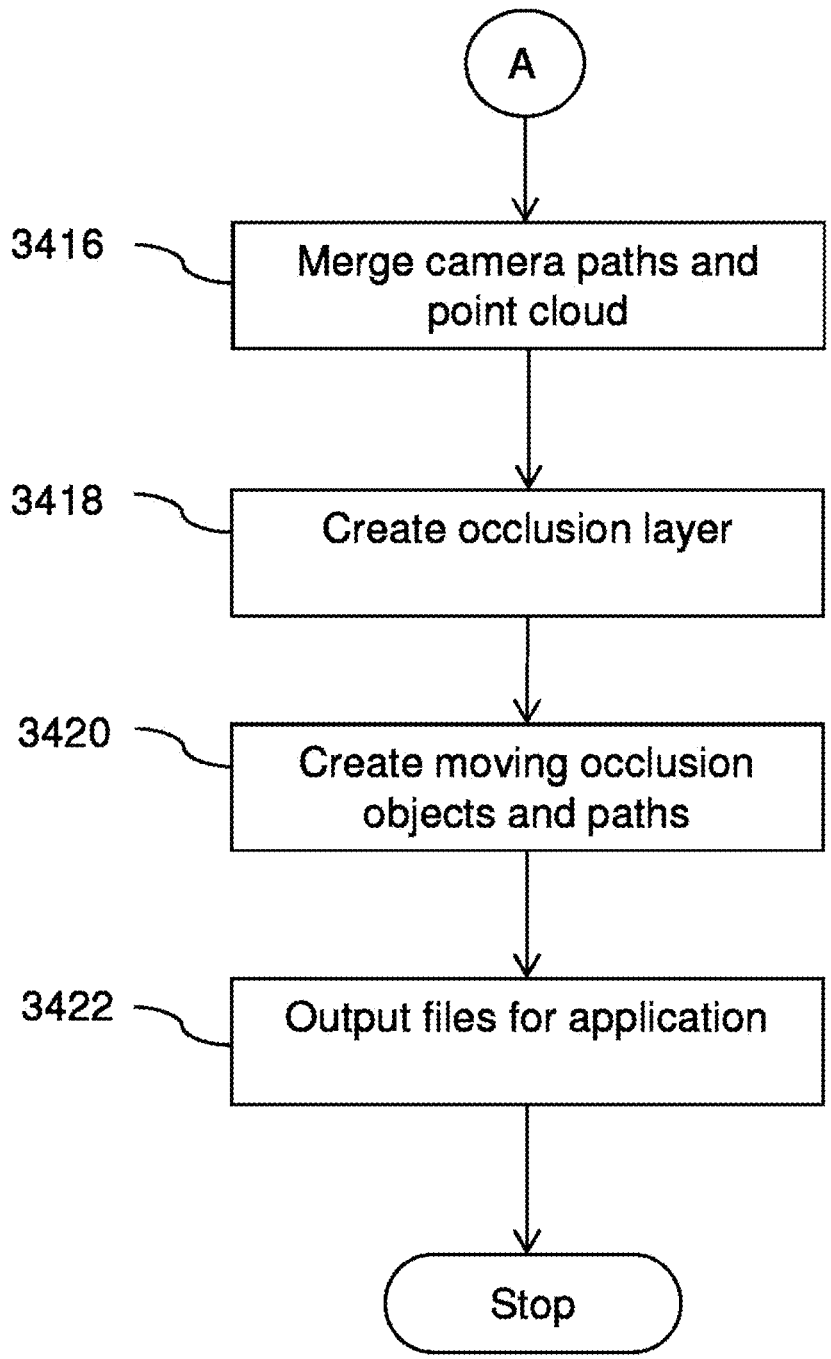
FIG. 4B conceptually illustrates a process for generating and visualizing synthetic objects within a mixed reality environment in accordance with an embodiment of the invention.

Many embodiments of the invention are able to generate a mixed reality environment that includes synthetic and real-world objects that are able to interact in a realistic manner. Processes for generating and visualizing synthetic objects within a mixed reality environment in accordance with embodiments of the invention are illustrated in FIG. 4A and FIG. 4B. In particular, FIGS. 4A and 4B illustrate a process 3400 of visualizing synthetic objects within a real-world video file. The process at 3402, obtains a video file and synthetic object/objects. It may be possible that the video file may require some corrections related to a lens distortion, color information adjustments, and stabilization of the video to remove undesired shaking or other movement of the camera.

At 3404, an analysis may be performed for checking correction of the video images of the video file. In an embodiment of the invention, the analysis may be performed by a correction module (not shown in the FIGS.) stored in the memory 104.

At 3406, a determination for correction needed may be made, based on the analysis. In certain embodiments, the correction may be needed for a lens distortion depending upon the lens used in the original video recording process, color information adjustments both for esthetic reasons, better estimation by the software of the camera movement, and stabilization of the video to remove undesired shaking or other movement of the camera. Those skilled in the art will appreciate that corrections to the video file may facilitate an efficient process of data extraction. In certain embodiments of the invention, the determination may be made by the correction module.

At 3408, corrections may be applied to the video frames. The video file may be updated accordingly. In certain embodiments of the invention, the corrections may be applied by the correction module.

At 3410, final video frames may be prepared. In an embodiment of the invention, the final video frames may be prepared by the correction module. Next, the step 3412 (extracting camera information), step 3414 (outputting files to the developer module), step 3416 (merging camera movement coordinates and point cloud coordinates), step 3418 (creating occlusion layer), step 3420 (creating moving occlusion objects), and step 3422 (outputting files to the viewer module) may be performed to visualize the synthetic objects within the video file, as discussed in conjunction with description of FIGS. 3A and 3B.

System Architecture for 360 Degree Mixed Reality Application

Figure 5:
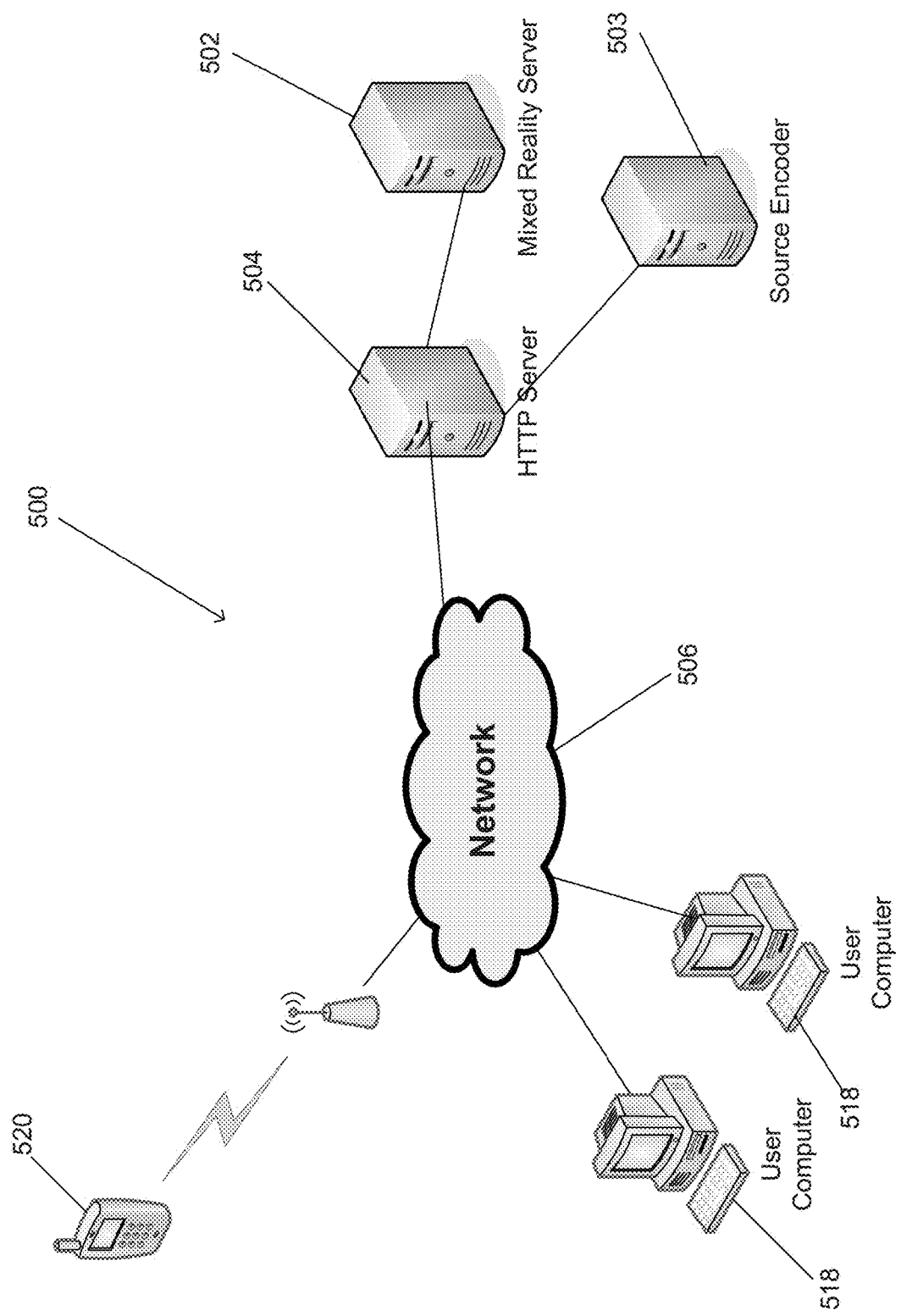
FIG. 5 illustrates a system for generating a 360 degree mixed reality environment for distribution and subsequent playback on user devices in accordance with an embodiment of the invention.

A system for generating a 360 degree mixed reality environment for distribution and subsequent playback on user devices in accordance with an embodiment of the invention is illustrated in FIG. 5. The system 500 includes a mixed reality application server 502 configured to generate a 360 degree mixed reality environment using one or more video clips. In many embodiments, the mixed reality application generates a 3D environment of a real-world video captured from a video camera. In certain embodiments, the 360 degree mixed reality application 502 combines the 3D environments that were generated for each of the multiple different real-world videos in order to generate a complete 360 degree mixed reality environment.

In many embodiments, a source encoder 502 may be used to reduce the size of the 360 degree mixed reality environment, including the size of the enhanced 3D video content relative to the original video content. In particular, in several embodiments the source encoder may reduce the size of the encoded video by reducing the number of frames in the video, which thereby reduces the nominal frame rate of the video. In order to reduce the size of an encoded video by reducing the frame rate, the source encoder in many embodiments may compute and store motion vectors describing the movement of pixels between frames of the source video sequence and delete frames from the source video sequence described by the motion vectors.

Well known compression standards that can be used to encode the sequence of frames contained within the re-encoded video content can include, among various other standards, the H.264/MEPG-4 AVC and the newer HEVC standard. The generation of motion vectors in accordance with various embodiments of the invention are discussed further below.

In the illustrated embodiment, the source encoder is a server including one or more processors directed by an encoding software application. In other embodiments, the source encoder can be any processing device including a processor and sufficient resources to perform the transcoding of source media including (but not limited to) video, audio, and/or subtitles. In some embodiments, the encoded video is then uploaded to a distribution server 504. In many embodiments, source encoder uploads the encoded video.

In a number of embodiments, the distribution server 504 distributes the encoded video to one or more playback devices 518-520 using one or more distribution channels. The distribution server may distribute the encoded video to different playback devices requesting video. In many embodiments, the distribution server receives and processes download requests from a variety of playback devices that seek to download the encoded video. When the distribution server receives a download request from a playback device, it can provide the playback device with access to download the encoded video. The encoded video may include motion vectors that the playback device can use to interpolate additional frames. A distribution server 504 can also push video content encoded in accordance with embodiments of the invention to playback devices.

In some embodiments, the distribution server 504 receives requests to stream video content from a variety of playback devices and subsequently streams the encoded video to the playback devices for playback. In several embodiments, the variety of playback devices can use HTTP or another appropriate stateless protocol to request streams via a network 506 such as the Internet. In several embodiments, a variety of playback devices can use RTSP whereby the distribution server records the state of each playback device and determines the video to stream based upon instructions received from the playback devices and stored data describing the state of the playback device.

In the illustrated embodiment, playback devices include personal computers, tablets 518 and mobile phones 520. In other embodiments, playback devices can include consumer electronics devices such as DVD players, Blu-ray players, televisions, set top boxes, video game consoles, tablets, and other devices that are capable of connecting to a server and playing back encoded video. Although a specific architecture is shown in FIG. 5, any of a variety of architectures can be utilized to generate and distribute a 360 degree mixed reality environment for distribution and playback on user devices as appropriate to the requirements of specific applications in accordance with embodiments of the invention.

Figure 6:
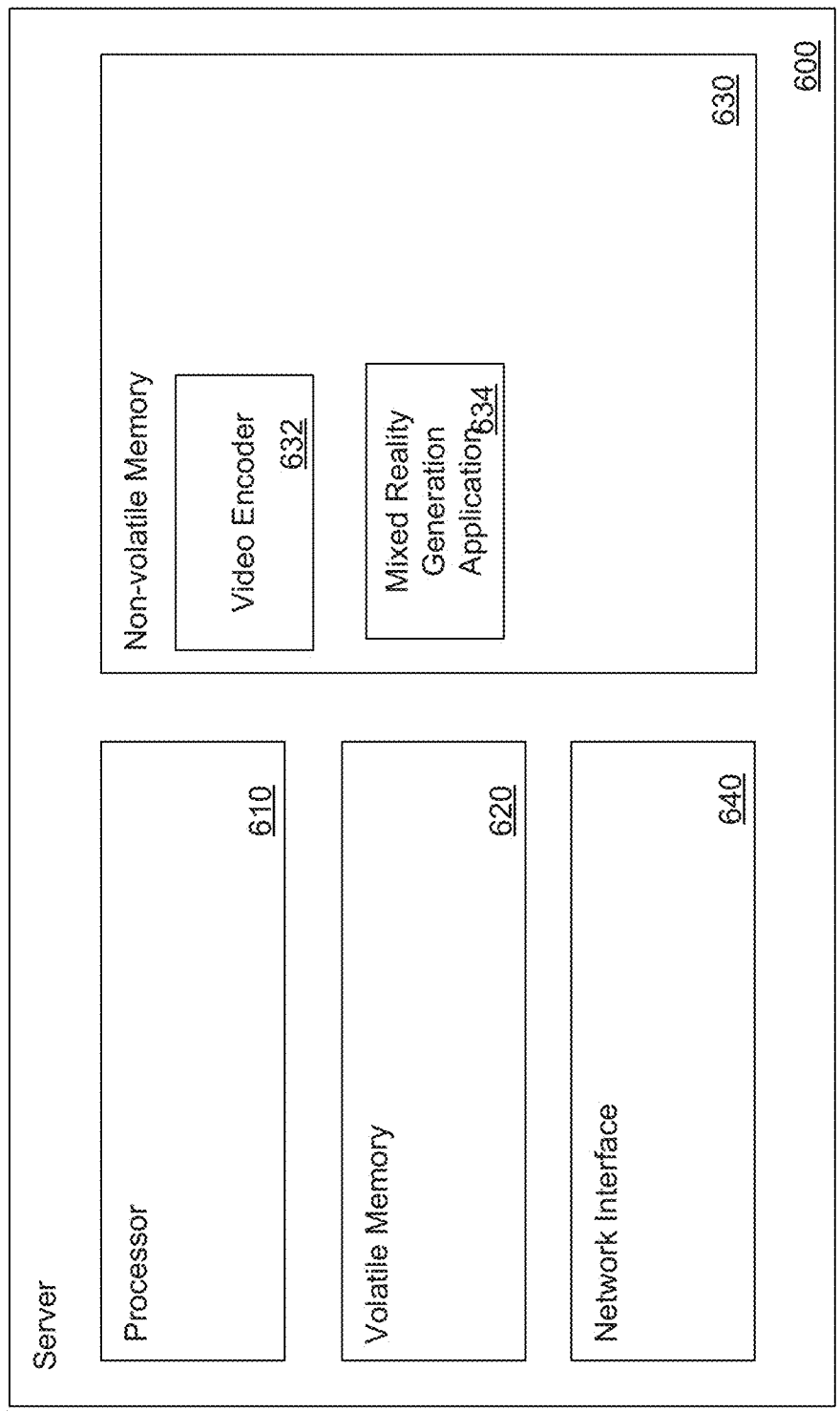
FIG. 6 illustrates an architecture of a 360 degree mixed reality server system in accordance with an embodiment of the invention.

The basic architecture of a 360 degree mixed reality server system in accordance with an embodiment of the invention is illustrated in FIG. 6. The mixed reality server 600 includes a processor 610 in communication with non-volatile memory 630, volatile memory 620, and a network interface 640. In the illustrated embodiment, the non-volatile memory 620 includes a video encoder 632 that configures the processor to encode video and a mixed reality generation application 634. In some embodiments, the video encoder may also reduce the size of an original piece of encoded video content by reducing the number of frames in the video sequence and generating motion vectors that may be used to interpolate the deleted frames during playback. In some embodiments, the 360 degree mixed reality generation application 634 generates a 360 degree mixed reality environment using one or more real world videos captured from one or more cameras. The 360 degree mixed reality generated application may also generate 3D environments for video clips, and combine the 3D environments to generate a 360 degree mixed reality environment.

In several embodiments, the network interface 640 may be in communication with the processor 610, the volatile memory 620, and/or the non-volatile memory 630. Although a specific source encoder architecture is illustrated in FIG. 6, any of a variety of architectures including architectures where the video encoder and/or mixed reality generation application is located on disk or some other form of storage and is loaded into volatile memory at runtime can be utilized to implement the mixed reality server in accordance with embodiments of the invention.

Playback Device

Figure 7:
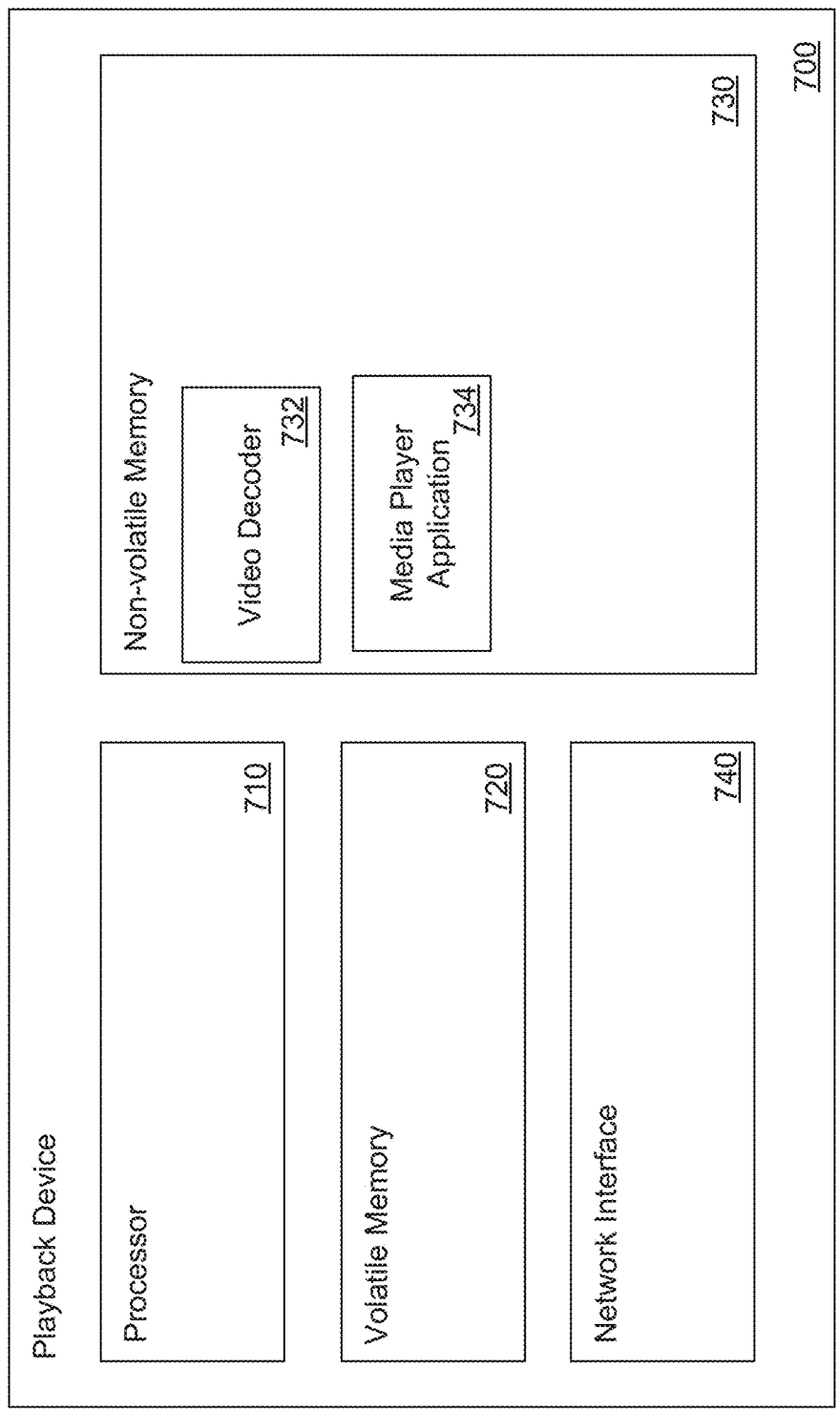
FIG. 7 illustrates an architecture of a playback device for playing back a 360 degree mixed reality environment in accordance with an embodiment of the invention.

The basic architecture of a playback device for playing back a 360 degree mixed reality environment in accordance with an embodiment of the invention is illustrated in FIG. 7. The playback device 700 includes a processor 710 in communication with non-volatile memory 730, volatile memory 720, and a network interface 740. The processor 710 can be implemented using one or more general purpose processors, one or more graphics processors, one or more FPGAs, and/or one or more ASICs. In the illustrated embodiment, the non-volatile memory 720 includes a video decoder 732 that configures the processor to decode encoded video and a media player application 734 configured to obtain encoded video and deliver an elementary bit stream of encoded video to the video decoder. In many embodiments, the media player application 734 may also extract motion vectors from the decoded video frames returned by the video decoder 732 and interpolate additional video frames using motion vector data obtained by the media player application as needed for different playback speeds of the video during playback. The media play application 734 may also display a 360 degree view of a mixed reality environment. In certain embodiments, the media player application may display a particular 3D environment corresponding to a particular real-world video, and may also change to different 3D environments based on a user's changing viewpoints with respect to the surrounding environment.

As noted above, the motion vector data can be embedded in the decoded frames and/or obtained from a variety of locations including (but not limited to) user data within the elementary bit-stream, data within a container file containing the encoded video, and/or a separate file obtained using a manifest that identifies the encoded video and the location of the motion vector data.

In several embodiments, the network interface 740 may be in communication with the processor 710, the volatile memory 720, and/or the non-volatile memory 730. Although FIG. 7 illustrates an example of a playback device architecture is illustrated in FIG. 7, any of a variety of architectures including architectures where the applications are located on disk or some other form of storage and is loaded into volatile memory at runtime can be utilized to implement playback devices in accordance with embodiments of the invention.

Generating 360 degree Mixed Reality Environment

Figure 8:
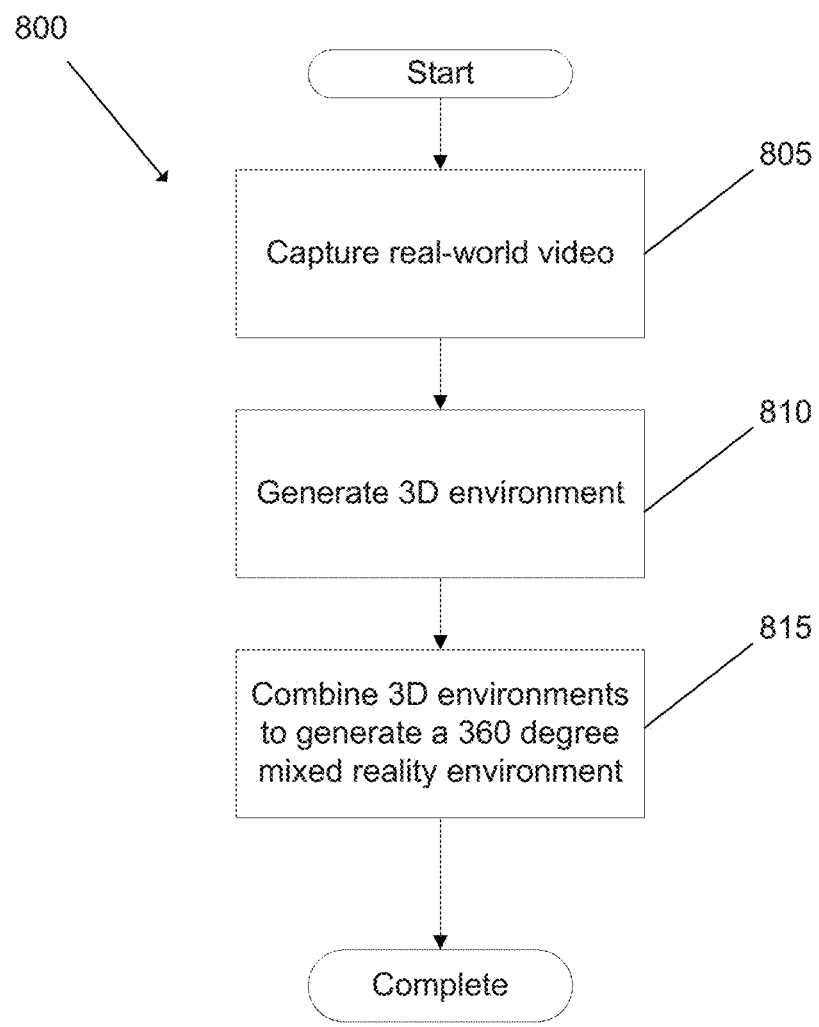
FIG. 8 conceptually illustrates a process for generating a complete 360 degree mixed reality environment using one or more real-world videos each captured from a particular camera in accordance with an embodiment of the invention.

As described above, many embodiments of the 360 degree mixed reality system generate one or more 3D environments, with each 3D environment generated using a real-world video captured from one or more cameras. In order to provide a complete 360 degree view of the surrounding environment, the 360 degree mixed reality system may then combine the various different 3D environments generated. A process for generating a complete 360 degree mixed reality environment using one or more real-world videos each captured from a particular camera in accordance with an embodiment of the invention is illustrated in FIG. 8.

The process captures (at 805) real-world video. In several embodiments, one or more video cameras may be used, with each video camera capturing a portion of the surrounding environment. In certain embodiments, the video camera(s) are attached to a moving vehicle (e.g. cars, bicycles, humans, boats, planes, or flying drones, etc.) as the vehicle moves through an environment, with each camera capturing directed towards a particular angle such that the combined cameras are able to capture a complete 360 degree view of the surrounding environment. In certain embodiments, one or more cameras may be used that use a panoramic lens, a 360 degree view lens, a fish-eye lens, and/or other types of lenses that may be able to capture varying amounts of the surrounding environment with varying degrees of pixel accuracy. In several embodiments, a single video camera that utilizes a 360 degree view lens may be used to capture the surrounding environment.

The process generates (at 810) a 3D environment using the captured real-world video. In some embodiments, the process generates a 3D environment for each real-world video captured by each individual camera. In particular, the process may generate the various layers (i.e., background video layer, occlusion layer) as described above with respect to FIGS. 33 and 34. Furthermore, the 3D environment may include the path guides that guide the movement of the 3D objects inside the 3D environment. Furthermore, the depth point cloud and camera movement may be generated for each real-world video.

The process combines (at 815) the 3D environments, each generated for a different real-world videos, to generate a complete 360 degree mixed reality environment. In some embodiments, the process stitches together individual video frames captured from different cameras in order to generate a complete 360 degree view. As described throughout this application, the 360 degree view may provide both a complete 360 degrees views horizontally and vertically, such that the user can view any point of the surrounding environment as they would be able to do in a real life setting. The process then completes. Although specific processes for generating a 360 degree mixed reality environment are described above with reference to FIG. 8, any of a variety of processes may be utilized to generate a 360 degree mixed reality environment from one or more real-world videos captured from different cameras as appropriate to the requirements of specific applications in accordance with embodiments of the invention.

Processes for playing back video of a 360 degree mixed reality environment in accordance with various embodiments of the invention are described below.

Playback and Display of 360 degree Mixed Reality Environment

Figure 9:
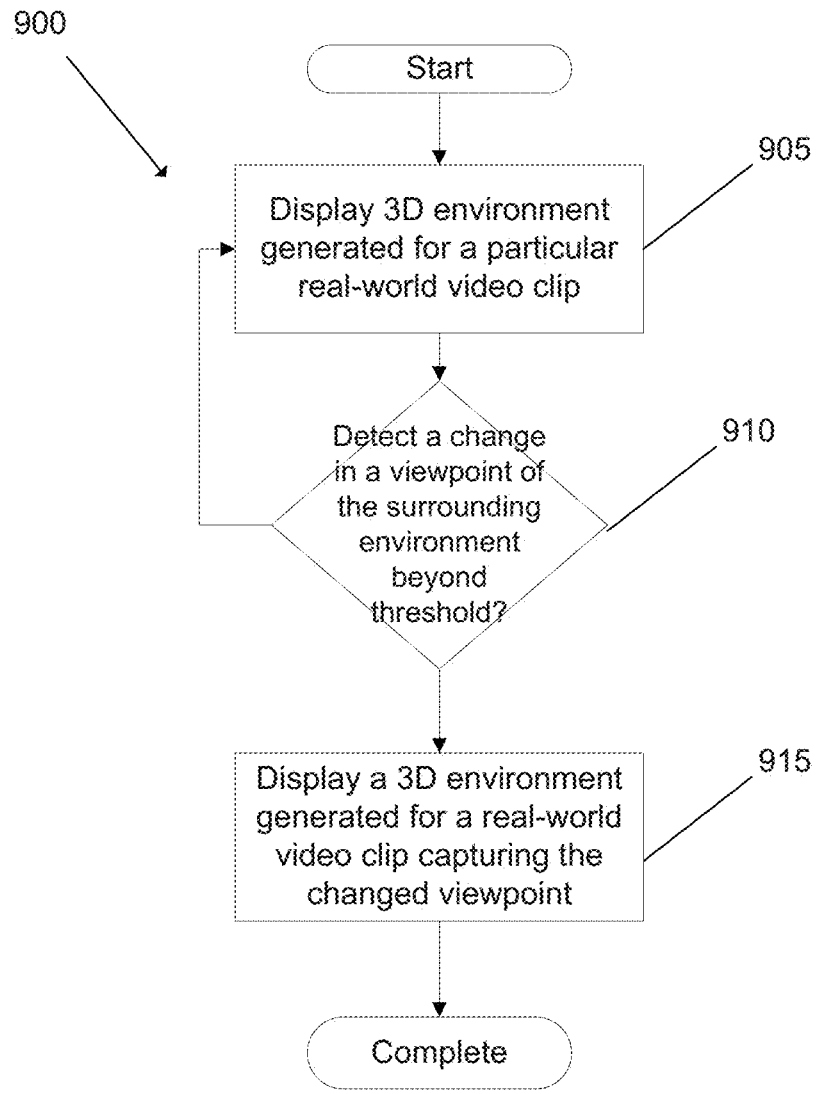
FIG. 9 conceptually illustrates a process for displaying a 360 degree mixed reality environment in accordance with an embodiment of the invention.

In many embodiments, a user device may include a media player application that is capable of displaying a 360 degree mixed reality environment generated from one or more real world videos captured from different camera angles. A process for displaying a 360 degree mixed reality environment in accordance with an embodiment of the invention is illustrated in FIG. 9.

The process 900 displays (at 905) a particular 3D environment generated for a particular real-world video, where the 3D environment displays a portion of the total surrounding mixed reality environment. In some embodiments, when the application initially launches, it may be set to display a particular viewpoint of the environment, such as a forward view. In several embodiments, the particular viewpoint that is displayed may be determined based on inputs received from one or more devices, including virtual reality headsets, glasses, motion sensors, among various other sensing devices. In particular, the portion of the 3D environment may correspond to a particular direction in which a user is currently viewing their surrounding environment. For example, a user wearing a virtual reality headset and that is looking up towards the sky (or ceiling) may likewise be viewing the corresponding top portion of the surrounding environment within the 360 degree mixed reality environment.

The process determines (at 910) whether it detects a change in viewpoint of the surrounding environment that exceeds a particular threshold. For example, a user may rotate, using an input device such as a controller, or by rotating their head in a particular direction, the view being displayed by their device. Accordingly, the process determines whether the change in view point exceeds a particular threshold. In several embodiments, the threshold may correspond to a point at which a different 3D environment generated from a different real world video capturing a different portion of the surrounding environment should be displayed. For example, if a user rotates the view by 90 degrees from a front to a side, then the 3D environment that should be displayed should have been generated using one of the side mounted video cameras.

If the change exceeds the threshold, the process displays (at 915) a 3D environment generated for a real-world video that captures the changed viewpoint. The process then completes. Although specific process for displaying a 360 degree mixed reality environment are described above with reference to FIG. 9, any of a variety of processes may be utilized as appropriate to the requirements of specific applications for displaying a 360 degree mixed reality environment in accordance with embodiments of the invention. Various camera configurations for capturing real world video for use in generating a 360 degree mixed reality environment in accordance with embodiments of the invention are described below.

360 Degree Camera Configurations

Figure 10:
FIG. 10 illustrates a camera configuration for capturing real world video in accordance with an embodiment of the invention.

In certain embodiments, the real world video may be captured using a camera configuration as illustrated in FIG. 10. As illustrated in this figure, one or more cameras may be positioned on top of a vehicle, with different cameras pointed in different directions in order to capture a complete 360 degree view of the surrounding environment. However, this camera configuration may present certain drawbacks. In particular, for a example, for a fitness application in which a user is running through the environment, the camera may be at too high a vantage point from the ground as compared to a human eye level, and thus may not provide as realistic a user experience. Furthermore, if a user were too navigate the view downwards, they would see a vehicle, rather than a street below them.

Figure 11:
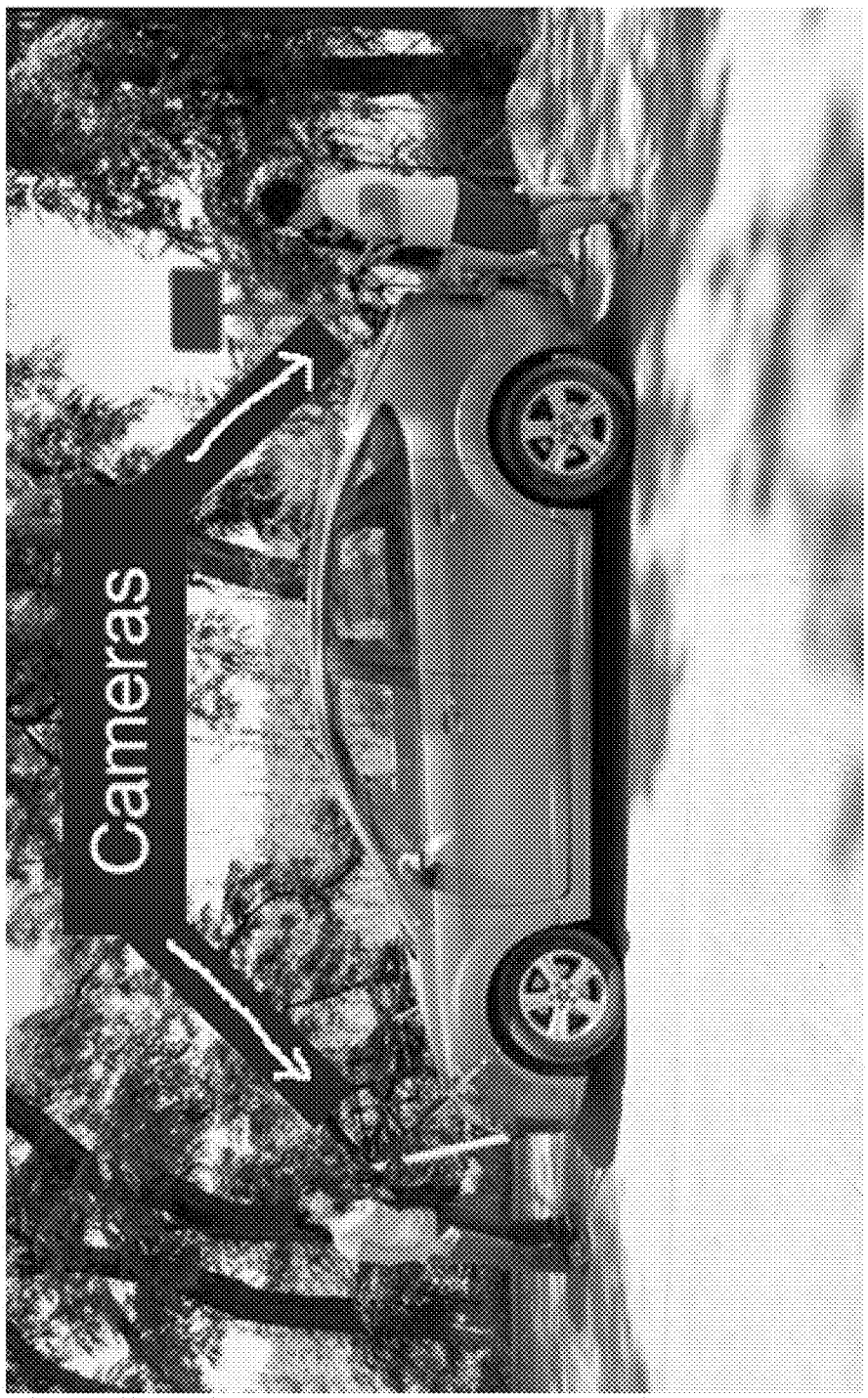
FIG. 11 illustrates a camera configuration for capturing real world video to provide a realistic 360 degree mixed reality environment in accordance with an embodiment of the invention.

Accordingly, several embodiments of the invention may utilize a camera configuration that uses one or more cameras positioned at heights that more closely correspond to the average human eye level. An example of a camera configuration for capturing real world video to provide a realistic 360 degree mixed reality environment in accordance with an embodiment of the invention is illustrated in FIG. 11. As described above, when recording video from a vehicle such as a car (e.g., illustrated in FIG. 11) or a boat, one of the displeasing effects may be that the vehicle itself may appear in the captured video, thereby providing an unwanted effect of the mixed reality environment for the user.

Many embodiments of the invention are able to remove the vehicle from the captured video. In particular, many embodiments utilize the camera configuration illustrated in FIG. 11, which positions one or more cameras on a front portion of the vehicle, and one or more cameras on a back portion of the vehicle, with the cameras positioned near a human eye level. Furthermore, these cameras may also capture the ground and the sky, while avoiding capturing images of the corresponding vehicle to which they are being attached.

In some embodiments, because the front and rear cameras are capturing images while positioned at different locations from one another, the process may stich together these images using certain mechanisms that take into account these displacements. In particular, in the process of stitching together the separate video frames captured by the different cameras into one single frame that provides a complete 360 degree view of the surrounding environment, the standard approach may be to use video frames from each video camera captured at exactly the same time. However, this approach does not take into account the camera displacements and thus would not provide an accurate depiction of the surrounding environment. To overcome this, some embodiments of the invention may stitch together video frames from different cameras which have been captured at different times. An example of using video frames captured at different times to stitch together a 360 degree view of an environment in accordance with an embodiment of the invention is illustrated in FIG. 12.

Figure 12:
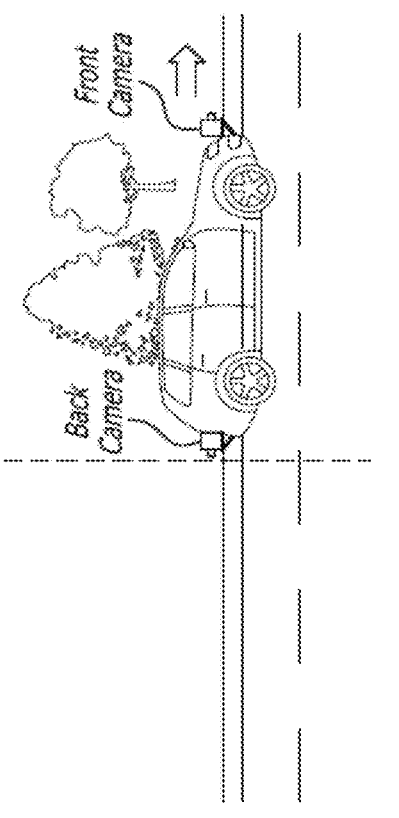
FIG. 12 illustrates using video frames captured at different times to stitch together a 360 degree view of an environment in accordance with an embodiment of the invention.
Figure 12:
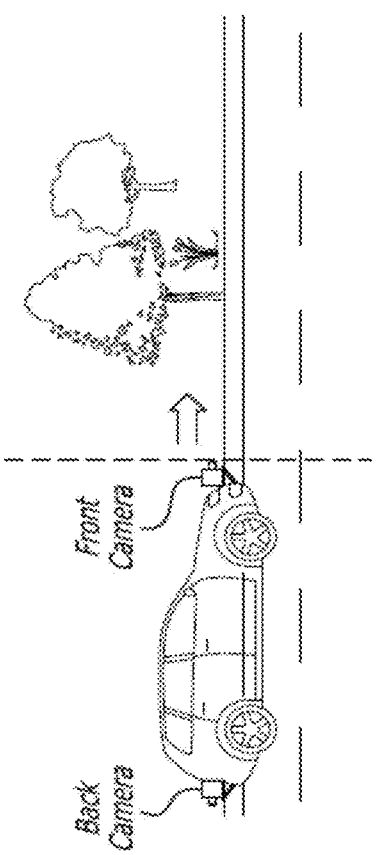

As illustrated in FIG. 12, a vehicle is outfitted with a camera configuration similar to the configuration used in FIG. 11 above. This example illustrates that as the vehicle, while moving in a forward direction, would pass a tree landmark at frame 100 by the front camera, and at frame 120 by the read camera, assuming that all cameras began capturing images at the same time and using the same capturing parameters (e.g., frame rate).

Figure 13:
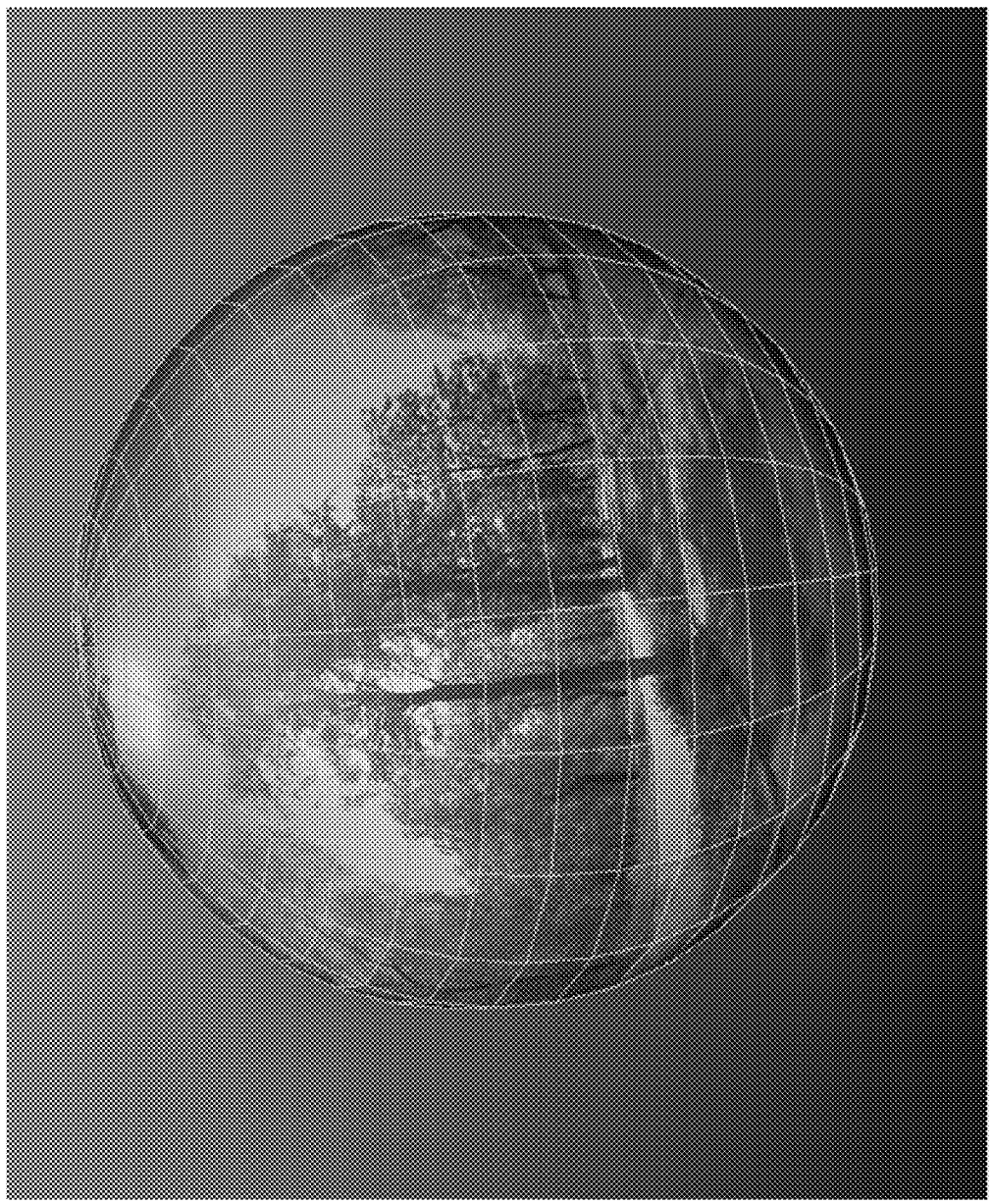
FIG. 13 illustrates an example of a 360 degree frame, which may have been stitched from multiple cameras or which may have been generated by a single camera using a 360 degree view lens, in accordance with an embodiment of the invention.

In order to stitch the frames from the different cameras to generate a 360 degree view, the system would stich the frames from the front camera at frame "X" with the frames from the rear camera at frame "X+20", and by stitching these frames, the vehicle will then be removed from the 360 degree environment. This may produce a visual effect that the cameras are floating in the air, as the cameras allow the user to move through the environment. One caveat for this process assumes that the vehicle is moving forward and that the movement is at a constant and known. Certain embodiments may factor in the particular characteristics of the movement of the vehicle as it captures the surrounding environment in order to determine the association of different frames from the different cameras that should be stitched together to generate the 360 degree view. For example, some embodiments may use a vehicle's speed, velocity, acceleration, GPS coordinates, among various other information that may be available in order to properly stitch the corresponding frames from the different cameras in order to generate a 360 degree frame of the surrounding environment. An example of a 360 degree frame, which may have been stitched from multiple cameras or which may have been generated by a single camera using a 360 degree view lens, in accordance with an embodiment of the invention is illustrated in FIG. 13.

Camera Path

Figure 14:
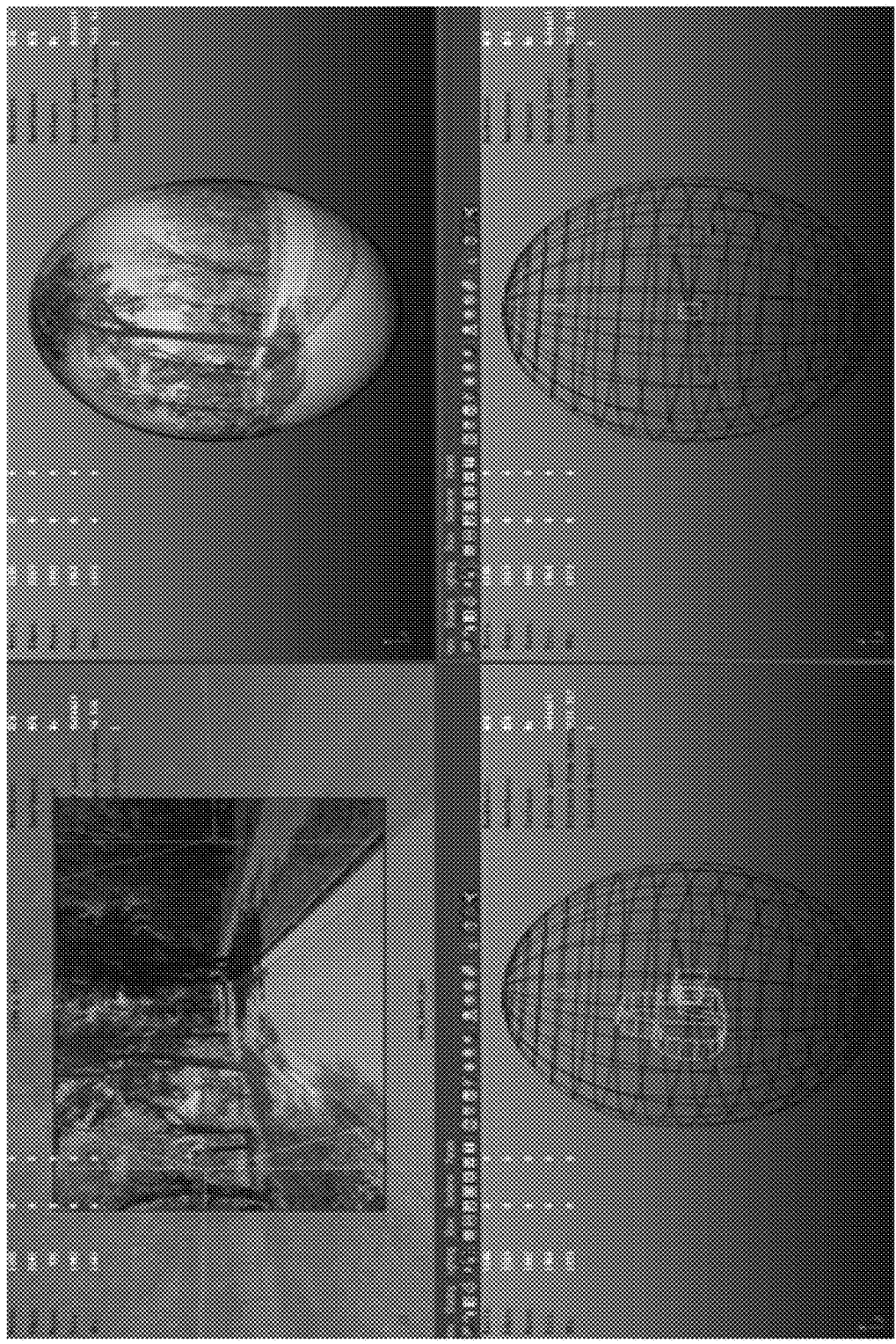
FIG. 14 illustrates a camera path with corresponding depth point cloud in accordance with an embodiment of the invention.

In order to generate a 360 degree mixed reality environment, some embodiments may derive a camera path in multiple directions for the different cameras being used. This allows for a "fit" of the 3D depth point cloud and camera movement to the view in multiple directions. In some embodiments, it may be possible that one single camera path and associated point cloud may be accurate enough to match the surrounding environment in the video in multiple directions. However, certain embodiments may use several camera paths and point clouds for accuracy. An example of a camera path with corresponding depth point cloud in accordance with an embodiment of the invention is illustrated in FIG. 14.

Figure 15:
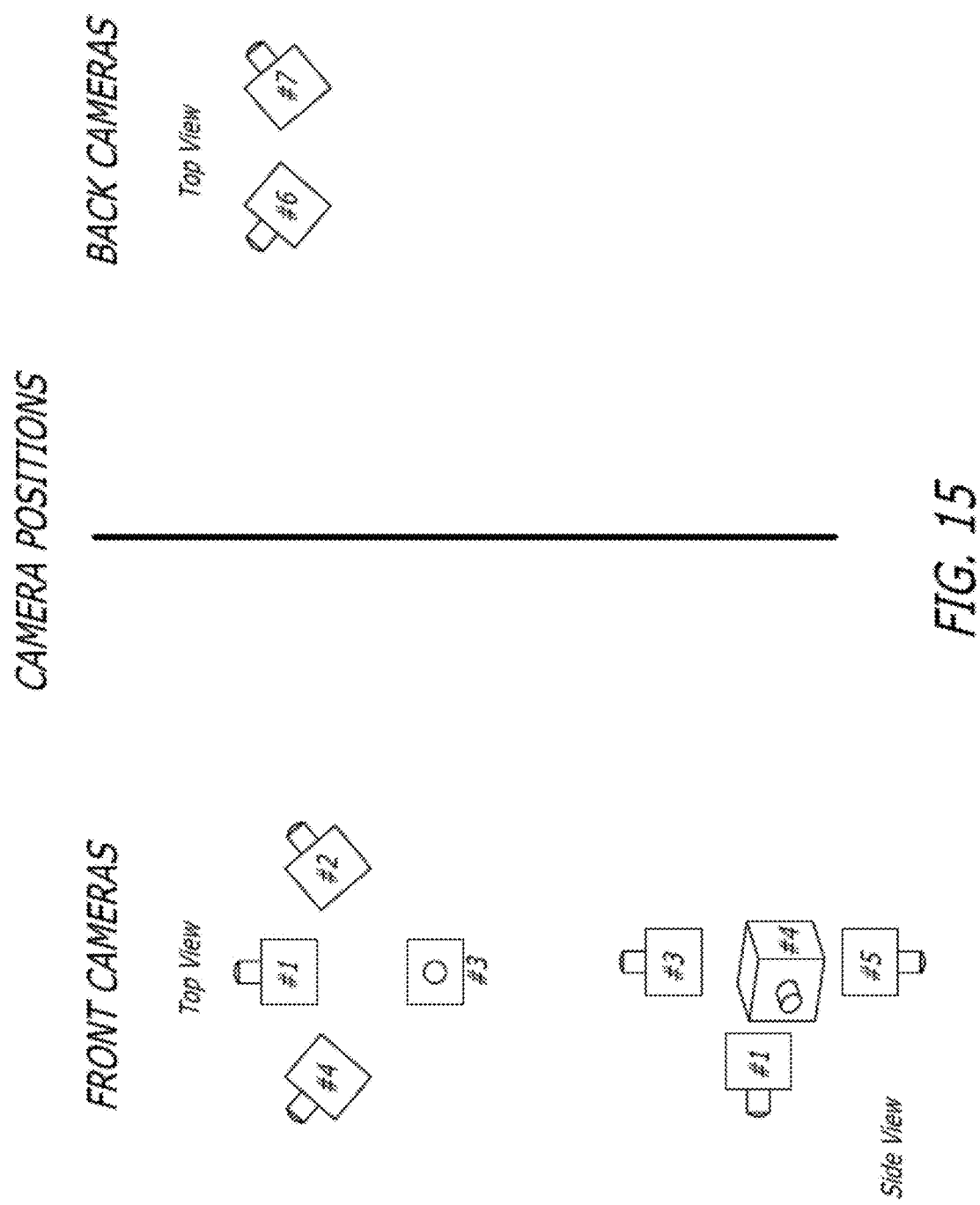
FIG. 15 illustrates a camera configuration for capturing 360 degree views of a surrounding environment for use in generating a 360 degree mixed reality environment in accordance with an embodiment of the invention.

An example of a camera configuration for capturing 360 degree views of a surrounding environment for use in generating a 360 degree mixed reality environment in accordance with an embodiment of the invention is illustrated in FIG. 15. As illustrated, there are a total of seven cameras being used, with each camera pointed at a particular direction/orientation. The top view illustrates four cameras on the front, with cameras 1, 2, and 4 aimed towards the front and sides of the vehicle and camera 3 pointed towards the sky. The side view also illustrates this configuration, but also shows camera 5, pointed towards the ground. The back cameras may include cameras six and seven pointed towards the rear/sides of the vehicle. Although a particular camera configuration for capturing a 360 degree view of the surrounding environment is illustrated in FIG. 15, any of a variety of different camera configurations may be used to capture a surrounding environment as appropriate to the requirements of specific applications. Furthermore, cameras may use various different imaging settings, including panoramic lenses, 360 degree lenses, fish-eye lenses, among various other camera configurations as appropriate.

Camera Path and Depth

Figure 16:
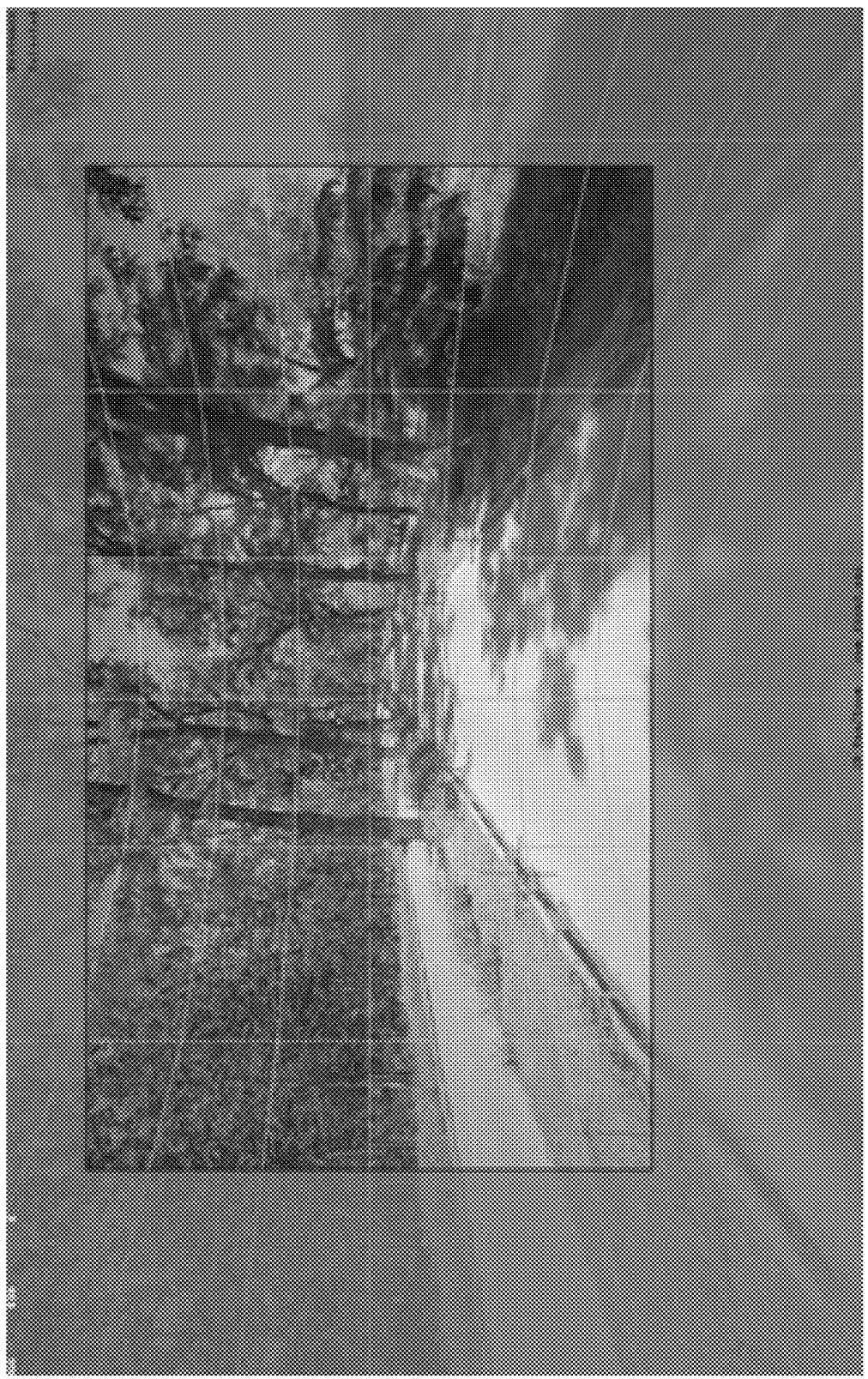
FIG. 16 illustrates an example of solving 3D camera and depth in a front direction using only footage from camera 1 in accordance with an embodiment of the invention.

As described above, in order to generate a 360 degree mixed reality environment, many embodiments compute a camera path and depth for each camera. FIG. 16 illustrates an example of solving 3D camera and depth in a front direction using only footage from camera 1, illustrated in FIG. 15 above, in accordance with an embodiment of the invention.

Figure 17:
FIG. 17 illustrates an example of also solving the 3D camera path and depth from cameras 6 and 7, stitched together, and from a backwards view from the car.
Figure 18:
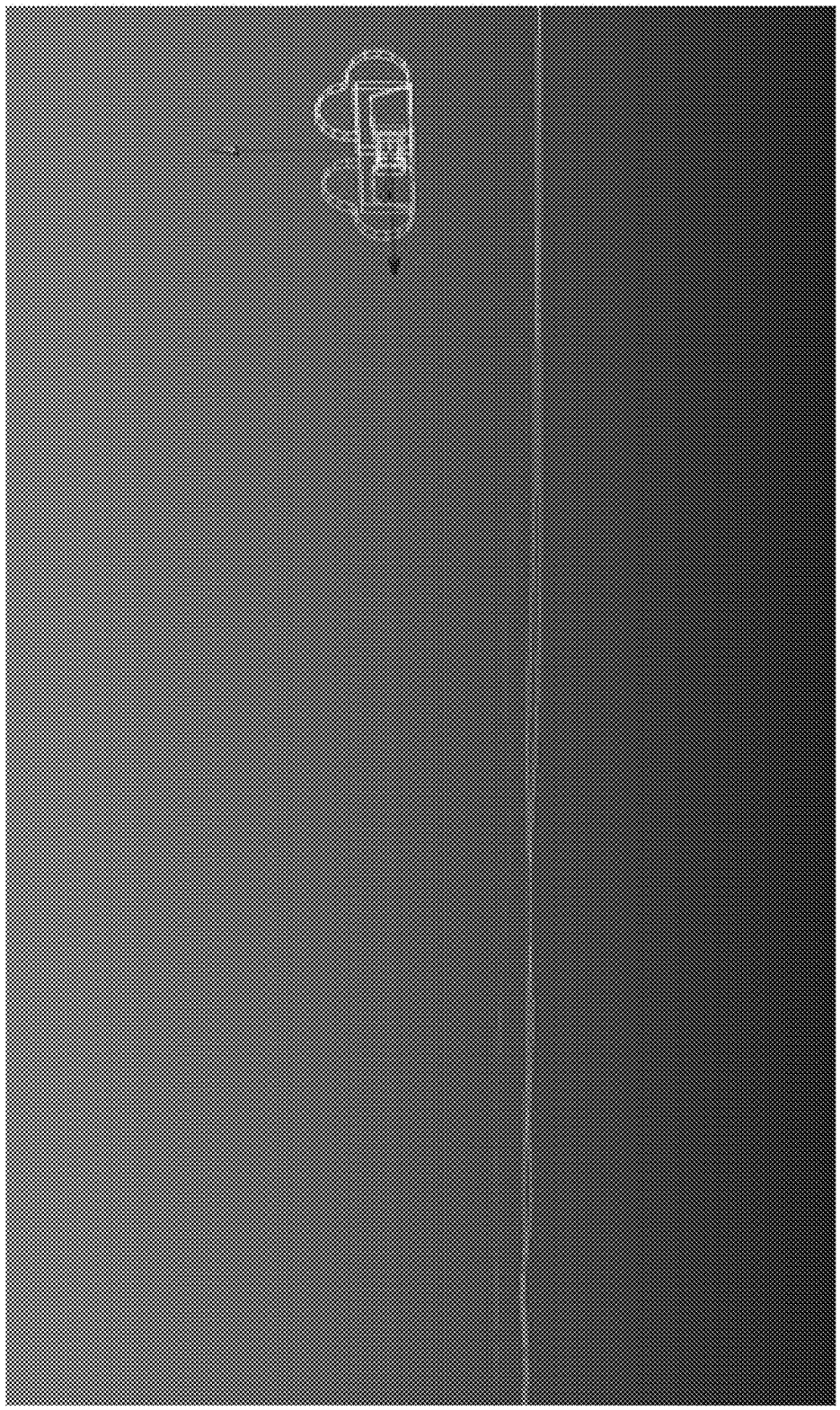
FIG. 18 illustrates two separate 3D camera paths and depth point clouds that have been combined in accordance with an embodiment of the invention.

FIG. 17 illustrates an example of also solving the 3D camera path and depth from cameras 6 and 7, stitched together, and from a backwards view from the car. This generates two separate 3D camera paths and depth point clouds, illustrated in FIG. 18. In this example, each 3D camera is facing an opposite direction.

Figure 19:
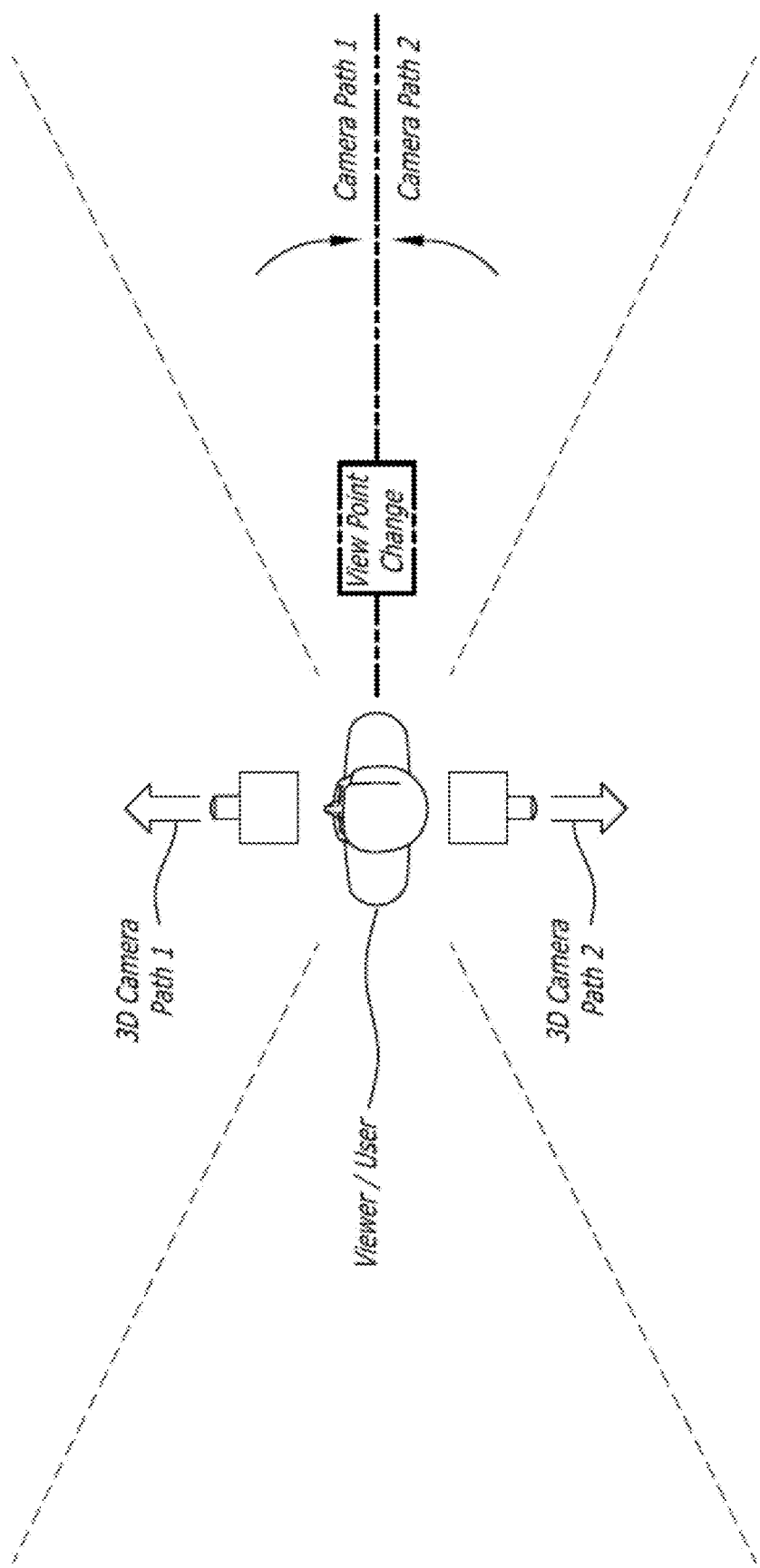
FIG. 19 illustrates an example of rotating to switch between camera paths, in particular, an example of when a user is facing/looking at the 360 degree view in the front direction, the user is shown the 3D environment (e.g., occlusion layer, background layer) built from camera 1, and when the user turns around, the user is shown the 3D environment generated from camera 2 in accordance with an embodiment of the invention.

As described above, separate occlusion layers and movement paths may be built for each 3D camera view. FIG. 19 illustrates an example that when a user is facing/looking at the 360 degree view in the front direction, the user is shown the 3D environment (e.g., occlusion layer, background layer) built from camera 1, and when the user turns around, the user is shown the 3D environment generated from camera 2.

At a certain point when a user it turning, there is a point at which the 360 degree virtual reality system may change the information that is presented and/or displayed to reflect the 3D environment, including the camera path, occlusion objects, background video layer, among various other embedded information, that best matches the particular view desired by the user.

In some embodiments, at the "view change points", the 3D data may be changed instantly to provide the data from a different 3D environment. In certain embodiments, the 3D data may be generated using an interpolation effect such that any visual differences between the changing views is minimized. In several embodiments, the camera paths, angles, and sizes of the 3D objects within the 3D environments may not be the same in the different views, and when changing views, these differences may be seen as jumps in location and/or size. Accordingly, the interpolation effects may be used to also reduce these jumps.

In embodiments where more than two 3D environments, including camera paths and corresponding occlusion and depth points are used, multiple view change points may be used.

Optimized Video File Size

For a 360 degree video, the size of the video frames may be significantly larger than a regular video frame, and thus the size of a 360 degree video is significantly larger than a regular video. For example, a reasonable comparison is that a user may view a part of a 360 degree video frame through a display window that provides a standard 1280×720 pixel resolution (e.g., a 720 p video view), or 0.9 megapixels. However, the full 360 degree video frame may be in the area of 4000×4000 pixels, or 16 megapixels. Accordingly, a full 360 degree video file, that provides a reasonable resolution and bitrate, may be significantly larger than a regular video.

In order to address computation issues related to storing and distributing such large video files, some embodiments store motion information from the different frames of the video within the actual frames (or in a separate file), in particular, may embedded the motion vectors in the video frame, which may then be used to generate new frames during the viewing process. Systems and methods for embedding motion vectors are described in detail in the U.S. patent application Ser. No. 14/503,029, entitled "SYSTEMS AND METHODS FOR MOTION-VECTOR-AIDED VIDEO INTERPOLATION USING REAL-TIME SMOOTH VIDEO PLAYBACK SPEED VARIATION", issued as U.S. Pat. No. 9,131,202, which is herein incorporated by reference in its entirety. By storing the motion vectors, the 360 degree virtual reality system is able to significantly reduce the file sizes of the required storage space than would otherwise be required.

Smooth Playback and Illusion of Real World

When using regular video in trying to generate a virtual environment, one in which a viewer can turn around and see in all directions, a change in the video playback speed may generate a stutter effect (if the video is slowed down), and the illusion of being in the location in the video is destroyed.

In certain embodiments, using the motion vector interpolation as applied to a 360 degree mixed reality environment, the viewer is able to see a perfectly smooth motion as the user moves through the environment at different and changing speeds, maintaining the realistic effect of the mixed reality experience.

Extending 360 Degree Video and Mixed Reality to VR with Automatic Stereoscopic View One of the factors that make a VR viewing experience convincing for the viewer is the 3D/stereoscopic element showing relative depth.

Some embodiments may include a shader in the 3D rendering in the game engine that extrudes features in the video in real time to make it feel 3D when watched in a 2 lens VR environment. The depth elements may be derived through a tracking process and embedded into the video frame in a method similar to the information embedded about the motion vectors, as described in U.S. patent application Ser. No. 14/503,029, issued as U.S. Pat. No. 9,131, 202 and incorporated herein by reference in its entirety. The depth information may be embedded next to the motion vector information, or it may be included in a separate file. Furthermore, the 3D depth information may be embedded in a similar manner as the motion vector data.

In some embodiments, by embedding a depth per pixel as a color coded depth field band in each frame, the mixed reality system may add a perspective effect to the frame in real time. Accordingly each pixel can be extruded based on its depth, and thus the frame can be converted to a 3D object. This may allow the camera to move freely in 3D space within a limited range in real time, adding a level of 3D interactivity to a normally static 2D video frame. This may be used for stereoscopic displacement in a VR scenario, so that each eye sees each video frame from a slightly different angle and thus creates a true 3D effect. This technique may provide for greater flexibility and has much lower bandwidth requirements than having two prerecorded video streams, one for each eye. In some embodiments, this may also allow the same video file to be viewed in 2*d* or 3D. The benefits also include a much easier recording process, in particular, only one camera may be needed. Furthermore, other benefits may include faster production, tracking, stitching and also a need to only store one video file. Furthermore, as this may be provided in real-time, some embodiments may allow a camera to move sideways with a realistic perspective effect as the user plays the game. This allows for a much more interactive and less prerecorded feel. Lastly, this may provide two high resolution videos, one for each eye. As each video may be recreated uniquely from the original high resolution video. This may be better than the regular side by side view, where the resolution of the source video may be cut in two.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive. Accordingly, the scope of the invention should be determined not by the embodiments illustrated, but by the appended claims and their equivalents.

What is claimed is:

1. A system for visualizing controllable virtual 3D objects within a mixed reality application using real-world video captured from a plurality of cameras, comprising:
    a processor;
    memory including a mixed reality application; and
    wherein the mixed reality application directs the processor to:
        obtain a plurality of real-world videos captured by one or more cameras, each real-world video capturing a different portion of a surrounding real-world environment as the one or more cameras move through the environment;
        for each real-world video, extract information comprising camera movement coordinates information, path coordinates information, and point cloud coordinates information, including a depth of objects shown in the real-world video and translating the information into three dimensional (3D) coordinates;
        for each real-world video, generate a 3D mixed reality environment comprising a plurality of separate, synched layers that includes (1) the real-world video as a background layer of the 3D mixed reality environment, (2) an occlusion layer that includes one or more transparent 3D objects that replicate real-world objects, including movement and rotation of the real-world objects, within the real-world video, and (3) one or more virtual synthetic objects, wherein the virtual synthetic objects interact with the transparent 3D objects based on 3D space locations of the objects and wherein the occlusion layer is used as a guide for the virtual synthetic objects to appear to move within the same environment as the real-world objects and to hide any virtual synthetic object that appears behind a transparent 3D object based on the depth information extracted from the real-world video; and
        combine at least one 3D mixed reality environment generated for a real-world video with a different 3D mixed reality environment generated for a different real-world video to provide a 3D mixed reality environment that replicates a larger portion of the surrounding real-world environment for use by the mixed reality application, wherein frames of the background layer of each real-world video are combined using the camera movement coordinates information of each real-world video.

2. The system of claim 1, wherein combining the at least one 3D mixed reality environment generated for the real-world video with the different 3D mixed reality environment generated for the different real-world video comprises stitching together frames from the different real-world video clips and combining the background and occlusion layers of each 3D mixed reality environment generated for each real-world video.

3. The system of claim 1, wherein the instructions when executed further configure the one or more processors to combine a plurality of 3D mixed reality environments to provide a complete 360 degree view of the surrounding real-world environment.

4. The system of claim 1, wherein the instructions when executed further configure the one or more processors to detect a user changing a view beyond a threshold and rendering a different 3D mixed reality environment generated for a real-world video corresponding to the current view.

5. The system of claim 1, wherein the instructions when executed further configure the one or more processors to store depth information of real-world objects within a video frame within a subset of pixels of the particular frame.

6. The system of claim 1, wherein the instructions when executed further configure the one or more processors to store motion vectors that describe movement of pixels between frames of video within a subset of pixels within a frame.

7. The system of claim 1, wherein a background layer of a 3D environment is one of a plurality of layers synched in the 3D environment.

8. The system of claim 1, wherein the instructions when executed further configure the one or more processors to render a different real-world video clip within the background layer when a user changes a direction of a path in the real-world video.

9. A non-transitory computer-readable medium containing computer-executable instructions that, when executed by a hardware processor, cause the hardware processor to perform a method for rendering a mixed reality environment, the method comprising:

obtaining a plurality of real-world videos captured by one or more cameras, each real-world video capturing a different portion of a surrounding real-world environment as the one or more cameras move through the environment;

for each real-world video, extracting information comprising camera movement coordinates information, path coordinates information, and point cloud coordinates information, including a depth of objects shown in the real-world video and translating the information into three dimensional (3D) coordinates;

for each real-world video, generating a 3D mixed reality environment comprising a plurality of separate, synched layers that includes (1) the real-world video as a background layer of the 3D mixed reality environment, (2) an occlusion layer that includes one or more transparent 3D objects that replicate real-world objects, including movement and rotation of the real-world objects, within the real-world video, and (3) one or more virtual synthetic objects, wherein the virtual synthetic objects interact with the transparent 3D objects based on 3D space locations of the objects, and wherein the occlusion layer is used as a guide for the virtual synthetic objects to appear to move within the same environment as the real-world objects and to hide any virtual synthetic object that appears behind a transparent 3D object based on the depth information extracted from the real-world video; and combining at least one 3D mixed reality environment generated for a real-world video with a different 3D mixed reality environment generated for a different real-world video to provide a 3D mixed reality environment that replicates a larger portion of the surrounding real-world environment for use by the mixed reality application, wherein frames of the background layer of each real-world video are combined using the camera movement coordinates information of each real-world video.

10. The non-transitory computer-readable medium of claim 9, wherein combining the at least one 3D mixed reality environment generated for the real-world video with the different 3D mixed reality environment generated for the different real-world video comprises stitching together frames from the different real-world video clips and combining the background and occlusion layers of each 3D mixed reality environment generated for each real-world video.

11. The non-transitory computer-readable medium of claim 9, wherein the method further comprises combining a plurality of 3D mixed reality environments to provide a complete 360 degree view of the surrounding real-world environment.

12. The non-transitory computer-readable medium of claim 9, wherein the method further comprises detecting a user changing a view beyond a threshold and rendering a different 3D mixed reality environment generated for a real-world video corresponding to the current view.

13. The non-transitory computer-readable medium of claim 9, wherein the method further comprises storing depth information of real-world objects within a video frame within a subset of pixels of the particular frame.

14. The non-transitory computer-readable medium of claim 9, wherein the method further comprises storing motion vectors that describe movement of pixels between frames of video within a subset of pixels within a frame.

15. The non-transitory computer-readable medium of claim 9, wherein a background layer of a 3D environment is one of a plurality of layers synched in the 3D environment.

16. The non-transitory computer-readable medium of claim 9, wherein the method further comprises rendering a different real-world video clip within the background layer when a user changes a direction of a path in the real-world video.

17. The non-transitory computer readable medium of claim 9, wherein the virtual synthetic objects interact with the transparent 3D objects based on 3D space locations of the objects such that virtual synthetic objects that are located behind transparent 3D objects based on the 3D space locations of the objects are occluded by the background layer.

18. The non-transitory computer readable medium of claim 9, wherein the virtual synthetic object is an avatar of a user, wherein the avatar moves based on activities of the user.

* * * * *